United States Patent
Wu et al.

(10) Patent No.: US 12,041,526 B2
(45) Date of Patent: Jul. 16, 2024

(54) LAYER 2 UE TO UE DATA FORWARDING

(71) Applicant: APPLE INC., Cupertino, CA (US)

(72) Inventors: Zhibin Wu, Cupertino, CA (US);
Chunxuan Ye, San Diego, CA (US);
Dawei Zhang, Cupertino, CA (US);
Fangli Xu, Beijing (CN); Haijing Hu,
Cupertino, CA (US); Haitong Sun,
Cupertino, CA (US); Wei Zeng,
Cupertino, CA (US); Yuqin Chen,
Beijing (CN)

(73) Assignee: APPLE INC., Cupertino, CA (US)

( * ) Notice: Subject to any disclaimer, the term of this patent is extended or adjusted under 35 U.S.C. 154(b) by 386 days.

(21) Appl. No.: 17/593,600

(22) PCT Filed: Oct. 22, 2020

(86) PCT No.: PCT/CN2020/122867
§ 371 (c)(1),
(2) Date: Sep. 21, 2021

(87) PCT Pub. No.: WO2022/082612
PCT Pub. Date: Apr. 28, 2022

(65) Prior Publication Data
US 2022/0303862 A1    Sep. 22, 2022

(51) Int. Cl.
*H04W 40/00*    (2009.01)
*H04L 45/00*    (2022.01)
(Continued)

(52) U.S. Cl.
CPC .............. *H04W 40/02* (2013.01); *H04L 45/66* (2013.01); *H04W 76/11* (2018.02); *H04W 88/04* (2013.01)

(58) Field of Classification Search
CPC ........ H04W 40/02; H04W 76/11; H04L 45/66
See application file for complete search history.

(56) References Cited

U.S. PATENT DOCUMENTS

2018/0205808 A1*  7/2018  Yang ..................... H04L 45/00
2018/0324848 A1   11/2018  Baghel et al.
(Continued)

FOREIGN PATENT DOCUMENTS

| CN | 110650550 A | 1/2020 |
| CN | 111727662 A | 9/2020 |
| EP | 3500046 A1 | 6/2019 |

OTHER PUBLICATIONS

Mediatek Inc., "Summary of [AT111-e][605][Relay] L2 Relay Mechanism", R2-2008254, 3GPP TSG-RAN WG2 Meeting #111 electronic, agenda item 8.7.3, Aug. 17-28, 2020, 71 pages.
(Continued)

*Primary Examiner* — Erika A Washington
(74) *Attorney, Agent, or Firm* — Dorsey & Whitney LLP

(57) ABSTRACT

Systems and methods for using a relay user equipment (UE) to transport data of interest received from a first remote UE to a second remote UE on a UE to UE relay within a wireless communication system are discussed herein. These methods may be performed at Layer 2 of a protocol stack of the wireless communication system. Data packets sent on the UE to UE relay may include an adaptation header including routing information (e.g., Layer 2 addresses, a bearer-specific index, etc.) for the UE to UE relay. An adaptation layer may accordingly be provided within Layer 2 to decode these adaptation headers. In some cases, a per-bearer approach may be used to map between individual direct bearers of a hop by hop path configuration of the UE to UE relay. Embodiments eschewing the adaptation header and instead using logical channel identifiers (LCIDs) to make routing indications are also described.

17 Claims, 19 Drawing Sheets

(51) Int. Cl.
*H04W 40/02* (2009.01)
*H04W 76/11* (2018.01)
*H04W 88/04* (2009.01)

(56) References Cited

U.S. PATENT DOCUMENTS

| | | | |
|---|---|---|---|
| 2019/0239284 A1 | 8/2019 | Xu et al. | |
| 2020/0154323 A1 | 5/2020 | Belleschi et al. | |
| 2021/0058826 A1* | 2/2021 | Mao | H04W 28/088 |
| 2021/0153063 A1* | 5/2021 | Zhang | H04W 28/0263 |

OTHER PUBLICATIONS

WIPO, International Search Report and Written Opinion, PCT/CN2020/122867, Jul. 21, 2021, 9 pages.
U.S. Appl. No. 18/494,980, Notice of Allowance, May 23, 2024, 9 pages.
Interdigital Inc., "Discussion and TP on UE to UE Relay Based on L2 Relay Architecture", R2-2006760, 3GPP RAN WG2 Meeting #111-e, Electronic Meeting, Agenda Item: 8.7.3, Aug. 17-28, 2020, 6 pages.
Apple, "Discussion on User Plane mechanisms for Layer 2 Relay", R2-2007100, 3GPP TSG-RAN WG2 Meeting #111e, Online, Agenda Item 8.7.3, Aug. 17-28, 2020, 2 pages.
Huawei, Hisilicon, "KI#4, Sol#9: Update on protocol stacks for Layer 2 UE-to-UE Relay", S2-2005643 (revision of S2-200xxxx), 3GPP TSG-WG SA2 Meeting #140E e-meeting, Elbonia, Agenda Item 8.8, Aug. 19-Sep. 1, 2020, 7 pages.

* cited by examiner

LAYER 2 UE TO UE DATA FORWARDING

TECHNICAL FIELD

This application relates generally to wireless communication systems, including wireless communication systems with one or more user equipment (UE) that can perform UE to UE relay functionalities using Layer 2 methods.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX), and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, cNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a newt generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7,125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
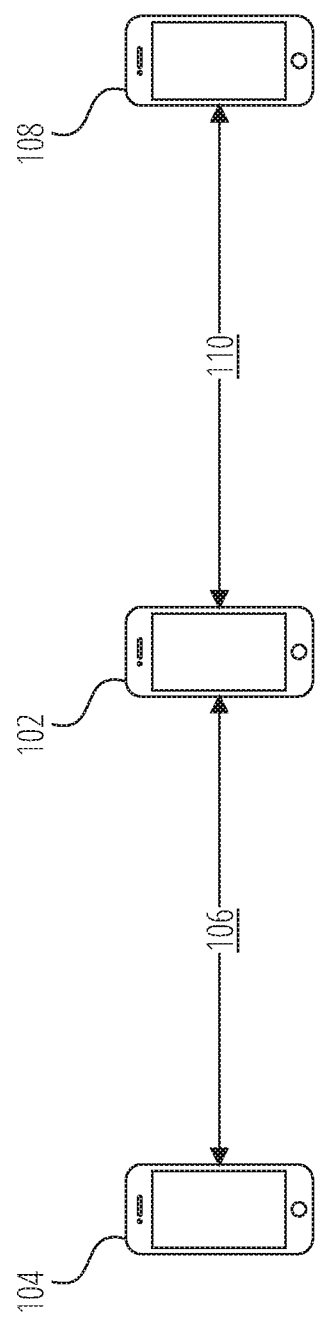
FIG. 1 illustrates a relay UE providing a UE to UE relay, according to an embodiment.

A relay UE may be capable of receiving data from one wireless mobile device and transporting it to another wireless mobile device. For example, a relay UE may be capable of receiving data from a first remote UE and transmitting it to a base station (and vice versa, from the base station to the first remote UE). In other words, the relay UE acts as a UE to network (NW) relay between the first remote UE and the base station. In other examples, a relay UE may be capable of receiving data from a first remote UE and transmitting it to a second remote UE (and vice versa, from the second remote UE to the first remote UE). In other words, the relay UE provides a UE to UE relay between the first remote UE and the second remote UE.

A UE providing a UE to UE relay may aid the connectivity of users of remote UEs to each other. For example, a relay UE may be helpful to a user of a first remote UE that is out of range of a second remote UE on sidelink (SL). In these cases, data may be communicated from the first remote UE to the relay UE providing a UE to UE relay, and then forwarded to the second remote UE on the UE to UE relay. A relay UE may be analogously used for UE to NW relay applications. In this fashion, communications from the first remote UE may be received by entities in the wireless communication system that are out of direct range of the first remote UE. This may be useful in cases where, for example, one or more various entities (UEs, base stations) of the wireless communication system are widely dispersed, with each entity in range of only one or only a handful (but not all) of the other entities within the wireless communication system.

It is contemplated that UE to UE relay functionalities may be implemented in Layer 2 (sometimes referred to herein as "L2") of a protocol stack of, for example, an NR wireless communication system (among other possible systems, such as, e.g., an LTE wireless communication system, or a hybrid or another wireless communication system). Further, any Layer 2 UE to UE relay functionalities used within a wireless communication system may correspond to/be designed for use with UE to NW relay functionalities within the wireless communication system that are implemented in Layer 2 of a protocol stack.

As compared to, for example, Layer 3 approaches, Layer 2 approaches disclosed herein may provide better end-to-end security protection (because the relay UE cannot peek into the data shared between remote UEs in such Layer 2 approaches). Moreover, the Layer 2 approach enables access stratum (AS)-layer mechanisms to ensure quality of service (QoS) and service continuity, which may not be possible using a Layer 3 relaying approach. Further, Layer 2 UE to UE relaying and Layer 2 UE to NW relaying can have a common scalable design which can be extended to support multi-hop relaying.

Systems implementing UE to UE relay functionalities may be useful in, for example, public safety cases or Vehicle-to-Everything (V2X) cases, where it is possible that a UE may be out of range of a base station, but within range of one or more (possibly dispersed) other UEs.

FIG. 1 illustrates a relay UE 102 providing a UE to UE, relay, according to an embodiment. The relay UE 102 may connect to a first remote UE 104 using the first PC5 link 106. The relay UE 102 may also connect to a second remote UE 108 on a second PC5 link 110. Data may be sent on one or both of the first PC5 link 106 and/or the second PC5 link 110. These data transmissions (and other data transmissions on a PC5 link) may be discussed herein as "SL transmissions" or "SL messages".

The relay UE 102 may receive data of interest for the second remote UE 108 as part of one or more data packets from the first remote UE 104 on the first PC5 link 106. The relay UE 102 may then send this data of interest to the second remote UE 108 as part of one or more data packets on the second PC5 link 110.

The messaging described in relation to FIG. 1 may be usefully applied in various coverage scenarios. For example, it may be that all three of the relay UE 102, the first remote UE 104, and the second remote UE 108 are out of coverage (e.g., not within communication range of a base station of the wireless communication system). In this case, the first PC5 link 106 and the second PC5 link 110 can be used by these devices to enable communications between the first remote UE 104 and the second remote UE 108. As another example, it may be that only the relay UE 102 is in coverage. In this case, the relay UE 102 may forward data of interest to the second remote UE 108 as described (and this may happen directly via the UE to UE relay, rather than, for example, the relay UE 102 involving a base station by acting as a UE to NW relay). As another example, the relay UE 102 and one of the first remote UE 104 or second remote UE 108 is in coverage, but the other of the first remote UE 104 and the second remote UE 108 is out of coverage. In this case, the relay UE 102 may forward the data of interest from the one of the first remote UE 104 and the second remote UE 108 to the other of the first remote UE 104 and the second remote UE 108 directly (e.g., via the UE to UE relay) rather than involving the base station in the data transmission process, which may require a greater number of transmissions than in the UE to UE relay case.

It is anticipated that, in some embodiments, a relay UE that is providing a UE to UE relay could also provide a UE to NW relay.

Figure 2:
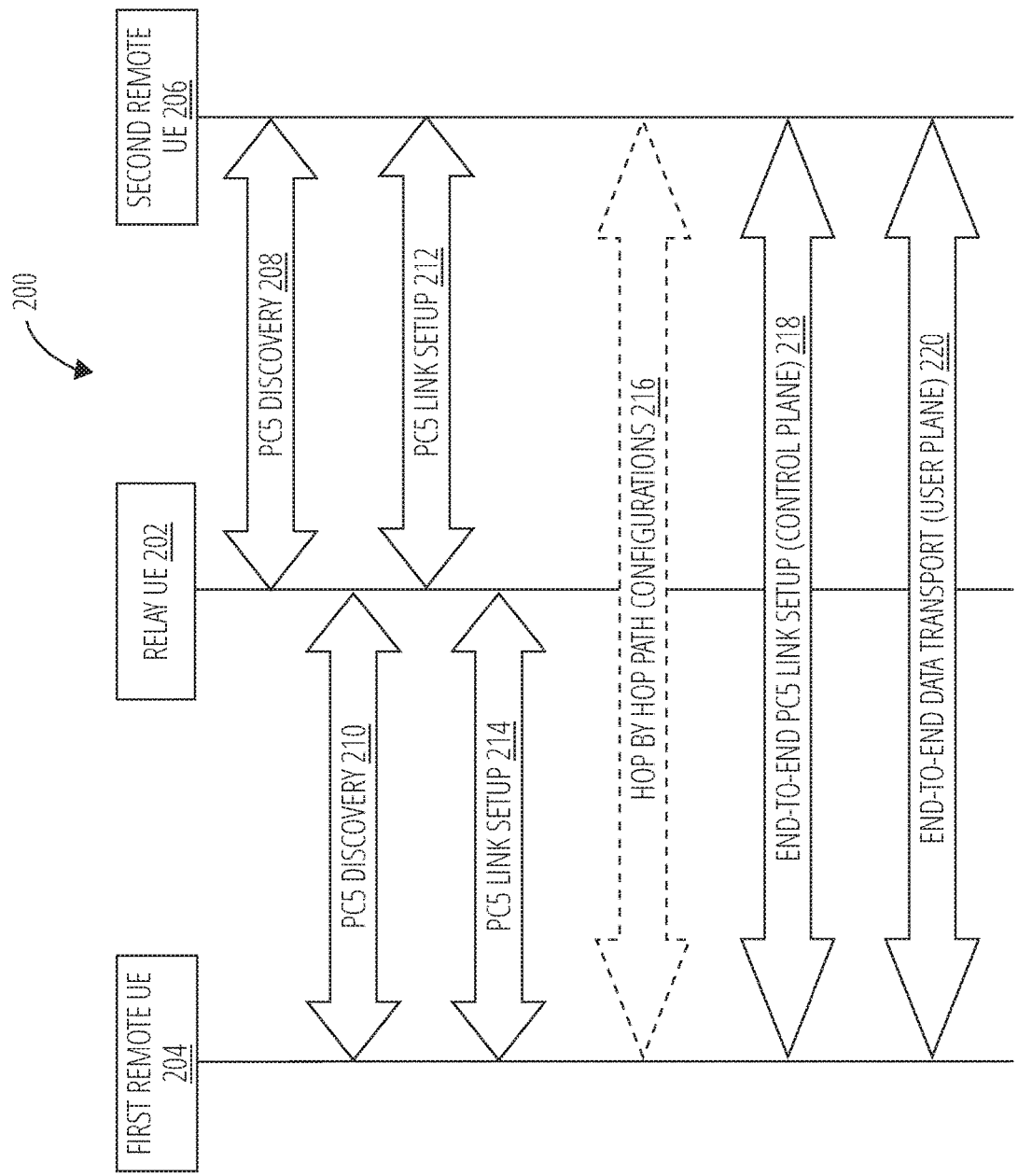
FIG. 2 illustrates a setup procedure for setting up a relay UE to provide a UE to UE relay between a first remote UE and a second remote UE, according to an embodiment.

FIG. 2 illustrates a setup procedure 200 for setting up a relay UE 202 to provide a UE to UE relay between a first remote UE 204 and a second remote UE 206, according to an embodiment. The setup procedure 200 may include performing first PC5 discovery 208, during which the relay UE 202 and the second remote UE 206 discover that they are within SL range of each other.

The setup procedure 200 may further include performing second PC5 discovery 210, during which the relay UE 202 and the first remote UE 204 discover that they are within SL range of each other.

The order of performing the first PC5 discovery 208 and the second PC5 discovery 210 may be reversed.

As part of performing the first PC5 discovery 208 and/or the second PC5 discovery 210, it may be that, for example, the first remote UE 204 discovers that the second remote UE 206 would be reachable by the first remote UE 204 via a UE to UE relay provided by the relay UE 202, and/or that the second remote UE 206 discovers that the first remote UE 204 would be reachable by the second remote UE 206 via a UE to UE relay provided by the relay UE 202.

The setup procedure 200 may further include performing the first PC5 link setup 212, during which the relay UE 202 and the second remote UE 206 establish a PC5 link (e.g., for SL communications) between themselves.

The setup procedure 200 may further include performing the second PC5 link setup 214, during which the relay UE 202 and the first remote UE 204 establish a PC5 link (e.g., for SL communications) between themselves.

The order of performing the first PC5 link setup 212 and the second PC5 link setup 214 may be reversed. Further, it is contemplated that each of the first PC5 discovery 208 and the first PC5 link setup 212 may both be performed prior to performing either/both of the second PC5 discovery 210 and/or the second PC5 link setup 214, and/or that each of the second PC5 discovery 210 and the second PC5 link setup 214 may both be performed prior to performing either/both of the first PC5 discovery 208 and/or the first PC5 link setup 212.

The setup procedure 200 further optionally includes performing the hop by hop path configurations 216. A "hop" may be one (of multiple) direct communications between UEs as part of a UE to UE relay (e.g., SL communications between the first remote UE 204 and the relay UE 202 may be a "hop," and SL communications between the relay UE 202 and the second remote UE 206 may be a "hop"). As will be described in further detail below, hop by hop path configurations 216 may be useful in cases where an adaptation header either does not carry, e.g., Layer 2 address(es) (sometimes referred to herein as "Layer 2 IDs" or "L2 IDs") in one or more data packets sent along a UE to UE relay, and/or where an adaptation header is not used at all in one or more data packets sent along a UE to UE relay. These hop by hop path configurations 216 may configure (or reconfigure) one or more (per-hop) direct bearers that are identified by the logical channel identifier (LCID) used in a data packet using the hop and/or data found in an adaptation header of a data packet using the hop. This may be the case for all hops between endpoints (e.g., in the case of FIG. 2, all hops between the first remote UE 204 and the second remote UE 206).

The setup procedure 200 may further include performing an end-to-end PC5 link setup (control plane) 218, where one or more end-to-end bearers are established between the endpoints (e.g., between the first remote UE 204 and the second remote UE 206). These end-to-end bearers may include or comprise bearers corresponding to single "hops" as discussed above. These end-to-end bearers may include SL signaling radio bearers (SRBs) and/or SL data radio bearers (DRBs). These end-to-end bearers may be set up using end-to-end PC5 signaling (PC5-S) procedures and/or end-to-end PC5 radio resource control (PC5-RRC) procedures. Each end-to-end bearer may have an ID that is unique as to other end-to-end bearers between its same pair of UE endpoints (but perhaps not unique globally within the wireless communication system).

The end-to-end PC5 link setup (control plane) 218 may not be performable until intermediate relay UEs (e.g., the relay UE 202) are ready to conduct forwarding of data that is not terminated locally at the respective relay UE. It is for this reason that, in some embodiments, the hop by hop path configurations 216 are performed. For example, in embodiments that use per-bearer reservation systems, the hop by hop path configurations 216 may be necessary (as opposed to embodiments using per-packet configurations, where all required routing information is conveyed in user plane headers (e.g., adaptation headers) in each data packet and thus the hop by hop path configurations 216 may not be necessary).

The setup procedure 200 further includes end-to-end data transport (user plane) 220. This end-to-end data transport (user plane) 220 may involve the transmission of data between end points and through relay UEs (e.g., the transmission of data between the first remote UE 204 and the second remote UE 206 via the relay UE 202), in the manner described above. This transport may involve end-to-end transport using SL DRBs via a relay UE, established in the manner described above.

Figure 3:
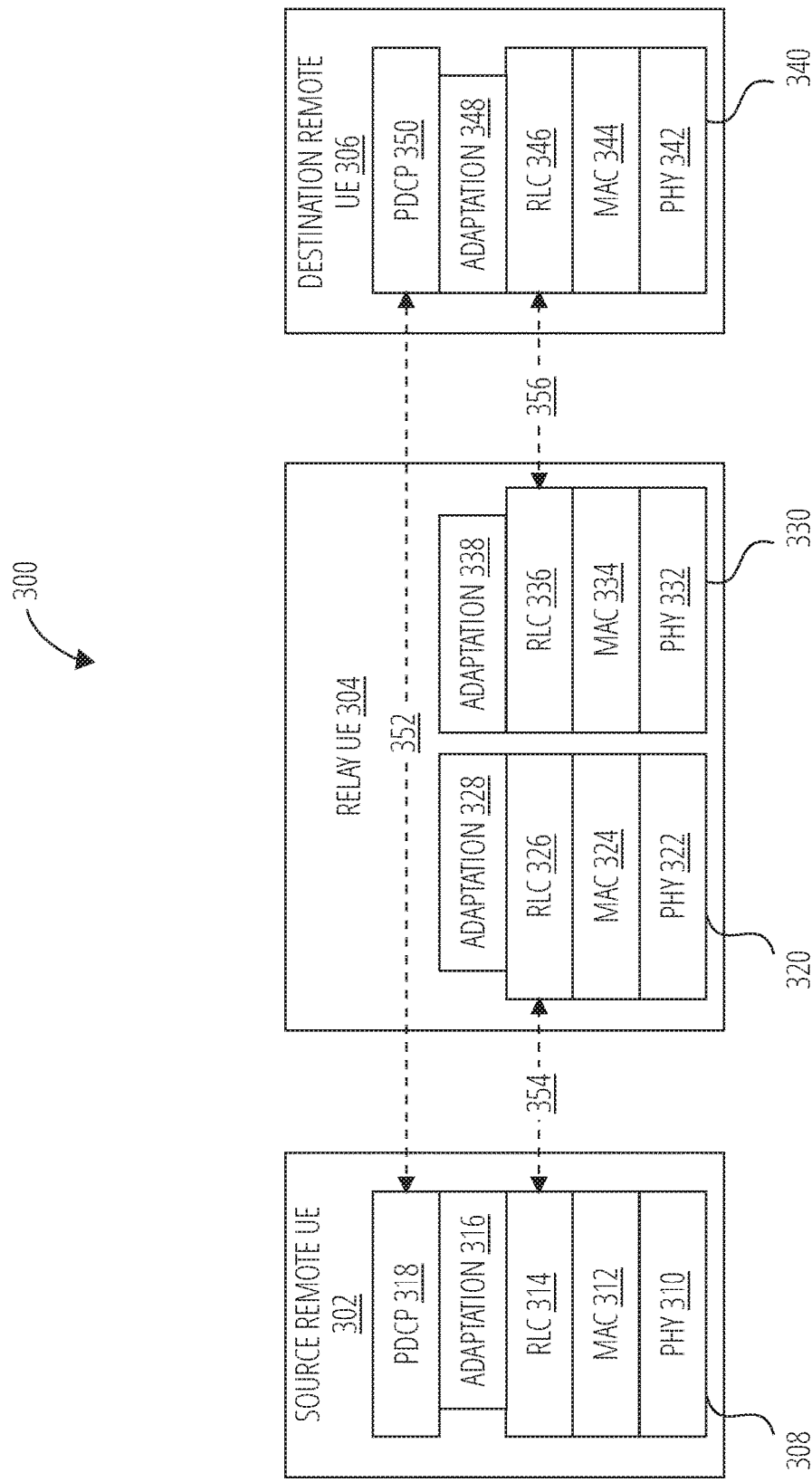
FIG. 3 is a diagram illustrating a source remote UE, a relay UE, and a destination remote UE and their various user protocol stacks, according to embodiments herein.

FIG. 3 is a diagram 300 illustrating a source remote UE 302, a relay LIE 304, and a destination remote UE 306 and their various user protocol stacks, according to embodiments herein. As described herein, a "source remote UE" may be a UE that initiates the UE to UE relay of data to a "destination remote UE." Correspondingly, the "destination remote UE" may be a UE that is the intended destination for such a data packet.

A user protocol stack according to embodiments here may include one or more of a physical (PRY) layer, a medium access control (MAC) layer, a radio link control (RLC) layer, an adaptation layer, and a packet data convergence protocol (PDCP) layer. As shown, an outgoing user protocol stack 308 of the source remote UE 302 according to embodiments here may be a include the PRY layer 310, the MAC layer 312, the RLC layer 314, the adaptation layer 316, and the PDCP layer 318, Further, the relay UE 304 may include the incoming user protocol stack 320, with the PHY layer 322, the MAC layer 324, the RLC layer 326, and the adaptation layer 328 and the outgoing user protocol stack 330 with the PHY layer 332, the MAC layer 334, the RLC layer 336, and the adaptation layer 338. Finally, the destination remote UE 306 may include the incoming user protocol stack 340 with the PHY layer 342, the MAC layer 344, the RLC layer 346, the adaptation layer 348, and the PDCP layer 350.

Each of a PHY layer, a MAC layer, an RLC layer, and a PDCP layer may be as these layers are understood by persons of ordinary skill in the art of relevant wireless communication systems (e.g, NR and/or LTE wireless communication systems).

An adaptation layer may be used to help a relay UE to make forwarding decisions as part of a Layer 2 forwarding process described herein. An adaptation header may be placed within a radio link control (RLC) protocol data unit (PDU) of a first data packet. The decoding of this adaptation header may occur at the adaptation layer. By decoding this adaptation header, the adaptation layer of an incoming user protocol stack may be enabled to identify bearers and/or next hops according to UE to UE relay embodiments. Further, an adaptation layer of an outgoing user protocol stack may be responsible for encoding corresponding information into an adaptation header of a second data packet that is to be sent according to a UE to UE relay functionality.

As illustrated relative to the relay UE 304 a UE (including, e.g., the source remote UE 302, the relay UE 304, and/or the destination remote UE 306) may use multiple instances of such a user plane protocol stack, with some being used corresponding to incoming data packets and others being used corresponding to outgoing data packets. For example, some of these instances, such as the incoming user protocol stack 320 and the incoming user protocol stack 340, may be for decoding received data packets, while other instances, such as the outgoing user protocol stack 308 and the outgoing user protocol stack 330, are used for encoding data packets to be sent.

UE to UE relay transmissions according to embodiments herein that use Layer 2 transmissions may use PDCP bearers as end-to-end bearers. These end-to-end PDCP bearers may include DRBs and SRBs. As illustrated, a transmission from the source remote UE 302 through the relay UE 304 and to the destination remote UE 306 according to a UE to UE relay transmission may use, e.g., a PDCP bearer 352 as an end-to-end bearer.

The PDCP bearer 352 may comprise each of a first RLC bearer 354 that travels from the source remote UE 302 to the relay UE 304 and the second RLC bearer 356 that travels from the destination remote relay UE 304 to the PHY layer 310. The first RLC bearer 354 and the second RLC bearer 356 may be examples of direct bearers as described herein.

Although the diagram 300 has been illustrated and described from the perspective of a source remote UE 302 sending data on a UE to UE relay via the relay UE 304 to a destination remote UE 306, it is contemplated that in many cases any of the UEs would be capable of performing the functions of any of the source remote UE 302, the relay UE 304, and/or the destination remote UE 306. Further, while only a single relay UE has been illustrated in the diagram 300, it is contemplated that analogous principles would apply as described herein to extend a UE to UE relay to use any number of relay UEs.

Figure 4:
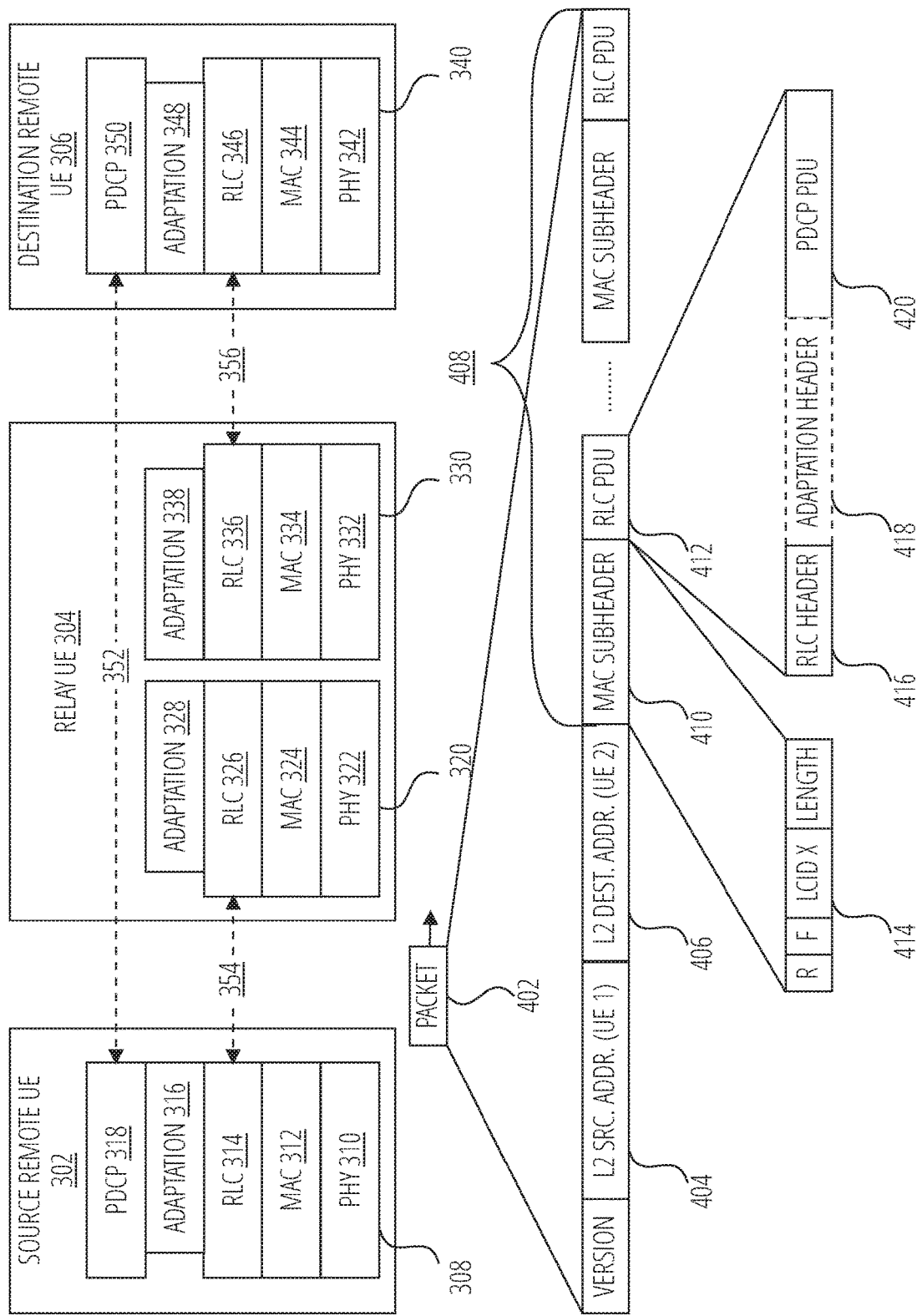
FIG. 4 illustrates the sending of a first data packet between a source remote UE and a relay UE according to a UE to UE relay between the source remote UE and a destination remote UE, according to an embodiment.

FIG. 4 illustrates the sending of a first data packet 402 between a source remote UE 302 and a relay UE 304 according to a UE to UE relay between the source remote UE 302 and a destination remote FE 306, according to an embodiment. The source remote UE 302, the relay UE 304, and the destination remote UE 306 (and the PDCP bearer 352, the first RLC bearer 354, and the second RLC bearer 356) may be those discussed above in relation to FIG. 3.

The first data packet 402 may include, among other things, a source UE Layer 2 address 404. The source UE Layer 2 address 404 may indicate a Layer 2 address of the source remote UE 302. The first data packet 402 may further include a destination UE Layer 2 address 406. The destination UE Layer 2 address 406 may indicate a Layer 2 address of the relay UE 304.

The first data packet 402 may further include a MAC PDU payload 408, which may include one or More MAC subheaders (such as the MAC subheader 410) and one or more RLC PDUs (such as the RLC PDU 412).

The MAC subheader 410 may include an LCID 414. The LCID 414 may be used to indicate QoS information to the relay UE 304. For example, if the LCID 414 is of a certain value understood by the relay UE 304, the relay UE 304 may treat the first data packet 402 with a certain QoS priority or treatment. In some embodiments, the LCID 414 may also include a routing indication that is used by the relay UE 304 to determine the identity of the destination remote UE 306 for routing purposes, as will be discussed in further detail below. It is contemplated that other MAC subheaders of the MAC PDU payload 408 could have analogous contents.

The RLC PDU 412 may be the portion of the packet that is conceptually "sent" on the first RLC bearer 354. The RLC PDU 412 may be decoded at, for example, the RLC layer 326 of the relay UE 304.

The RLC PDU 412 may include an RLC header 416.

Further, the RLC PDU 412 may include an adaptation header 418. The adaptation header 418 may include routing information that is useful to the relay UE 304 in determining the manner of forwarding data taken from the first data packet 402 to the destination remote UE 306. For example, the adaptation header 418 may include an identity of an end-to-end bearer (e.g., the PDCP bearer 352) between the source remote UE 302 and the destination remote UE 306. Additionally or alternatively, the adaptation header 418 may include a Layer 2 address for the source remote UE 302. Additionally or alternatively, the adaptation header 418 may include a Layer 2 address of the destination remote UE 306. Additionally or alternatively, the adaptation header 418 may include QoS information corresponding to the first data packet. Additionally or alternatively, the adaptation header 418 may include an index (sometimes referred to herein as a "local index") that can be used by the relay UE 304 to determine a bearer between the relay UE 304 and the destination remote UE 306 to use to forward data to the destination remote UE 306. The use of each of these types of routing information will be discussed in additional detail below. As will be discussed below, the adaptation header 418 may not be used in some embodiments herein when certain types of routing indications are possible in an LCID.

The RLC PDU 412 may further include a PDCP PDU 420. The PDCP PDU 420 may be the portion of the packet that is conceptually "sent" on the PDCP bearer 352. As illustrated, the PDCP PDU 420 may not be decoded at the relay UE 304 (because the relay UE 304 is not the ultimate destination of the PDCP PDU 420).

The PDCP PDU 420 may be or include the data of interest that is driving the use of the UE to UE relay provided by the relay UE 304 and that was determined (e.g., by the source remote UE 302) to be delivered from the source remote UE 302 to the destination remote UE 306 according to the UE to UE relay provided between these devices by the relay UE 304. Accordingly, and as will be shown in relation to FIG. 5, the PDCP PDU 420 may be forwarded by the relay UE 304 to the destination remote UE 306.

Figure 5:
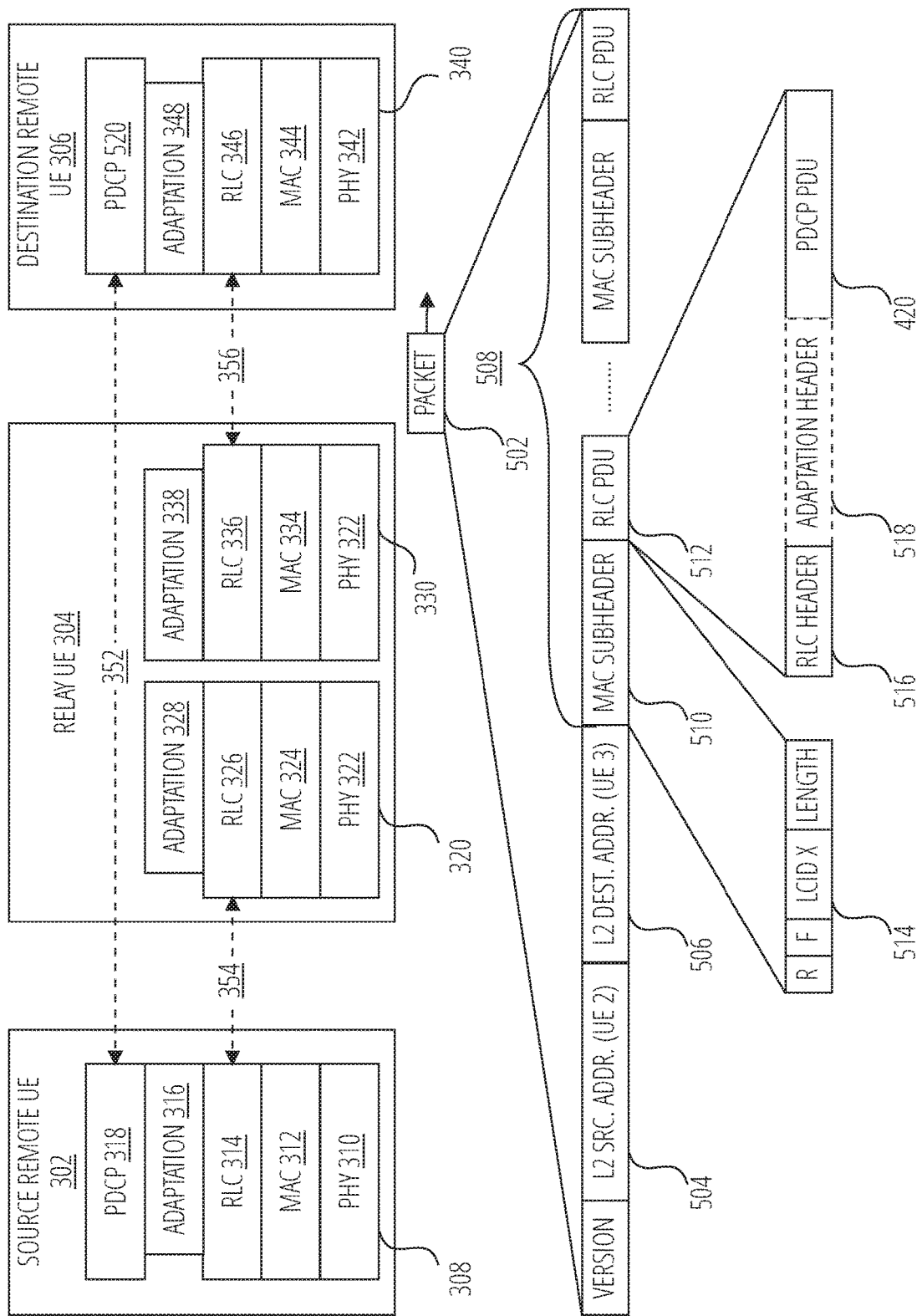
FIG. 5 illustrates the sending of a second data packet between a relay UE and a destination remote UE according to a UE to UE relay between the source remote UE and a destination remote UE, according to an embodiment.

FIG. 5 illustrates the sending of a second data packet 502 between a relay UE 304 and a destination remote UE 306 according to a UE to UE relay between the source remote UE 302 and a destination remote UE 306, according to an embodiment. The source remote UE 302, the relay UE 304, and the destination remote UE 306 (and the PDCP bearer 352, the first RLC bearer 354, and the second RLC bearer 356) may be those discussed above in relation to FIG. 3.

The second data packet 502 may include, among other things, a source UE Layer 2 address 504. The source UE Layer 2 address 504 may indicate a Layer 2 address of the relay UE 304. The second data packet 502 may further include a destination UE Layer 2 address 506. The destination UE Layer 2 address 506 may indicate a Layer 2 address of the destination remote UE 306.

The second data packet 502 may further include a MAC PCU payload 508, which may include one or more MAC subheaders (such as a MAC subheader 510) and one or more RLC PDUs (such as an RLC PDU 512).

The MAC subheader 510 may include an LCID 514. The LCID 514 may be of a value that indicates to the destination remote UE 306 that it is the ultimate destination for, e.g., the PDCP PDU 420 included in the second data packet 502.

The RLC PDU 512 may be the portion of the packet that is conceptually "sent" on the second RLC bearer 356. The RLC PDU 512 may be decoded at, for example, the RLC layer 346 of the destination remote UE 306.

The RLC PDU 512 main include an RLC header 516.

Further, the RLC PDU 512 may include an adaptation header 518. The adaptation header 518 may include routing information that is useful to the destination remote UE 306 in determining that it is the ultimate destination for, for example, the PDCP PDU 420 included in the second data packet 502. This will be discussed in further detail below. As will also be discussed, the adaptation header 518 may not be used in some embodiments herein when certain types of routing indications are possible in an LCID.

The RLC PDU 512 may further include the PDCP PDU 420 (e.g., the same PDCP PDU introduced in relation to FIG. 4). The PDCP PDU 420 may be the portion of the packet that is conceptually "sent" on the PDCP bearer 352. As discussed above, the PDCP PDU 420 may be or include the data of interest that is driving the use of the UE to UE relay provided by the relay UE 304 and that was determined (e.g., by the source remote UE 302) to be delivered from the source remote UE 302 to the destination remote UE 306 according to the UE to UE relay established between these devices by the relay UE 304. Because the destination remote UE 306 is the intended destination remote UE, the PDCP PDU 420 may be decoded at the PDCP layer 520 of the destination remote UE 306.

Solutions discussed herein may use the adaptation headers introduced above as included in one or more data packets that enable (in some cases, in conjunction with other information from the data packet, such as information found in an LCID of the data packet) to perform the illustrated UE to UE relay functionalities. Further solutions may eschew the adaptation header entirely and may be configured to make one or more routing indications in, for example, an LCID that are used for routing purposes. Any of these solutions may act to provide a way for a source UE to inform a relay UE to where (e.g., to which remote UE) to forward a data packet. In some embodiments, the usage of LCID to distinguish traffic to be forwarded to the (final) destination remote UE from the traffic to be passed up to the local PDCP entity can be avoided. For example, an adaptation header containing routing information may use one designated index value to label the packets which are to be processed locally. Alternatively or additionally, the adaptation header may include a destination remote UE layer 2 address of the traffic. In these kind of embodiments, the LCID may not indicate routing information, whereas the adaptation header is always used by the first remote UE for any outgoing traffic to guide the relay UEs which receive those traffic about how to process it.

A first approach may leverage per-packet configurations by explicitly placing one or more Layer 2 addresses in an adaption header. Under this approach, the UE may use PC5 QoS Identifier (PQI) to SL radio bearer (SLRB) mapping to classify traffic into different logical channels. In some cases, separate LCID values (even if corresponding to a same QoS priority or treatment) may be used to distinguish traffic terminated at the relay UE as opposed to traffic meant to be forwarded by a relay UE on a UE to UE relay provided by the relay UE.

Under the first approach, the adaptation header may be used to indicate both QoS information and, in many cases, a relay destination. The relay destination may be the Layer 2 address of the eventual destination remote UE.

The QoS information may be, for example, end-to-end QoS information or remaining QoS information. End-to-end QoS information may indicate that certain data on a given end-to-end bearer of the UE to UE, relay is to be treated with a certain (static) QoS priority or treatment at each hop. Remaining QoS information may be a total of remaining (unused) time left to deliver data to the destination remote UE, and may be updated at each hop of the UE to UE relay based on the amount of time it took to make the hop.

Figure 6:
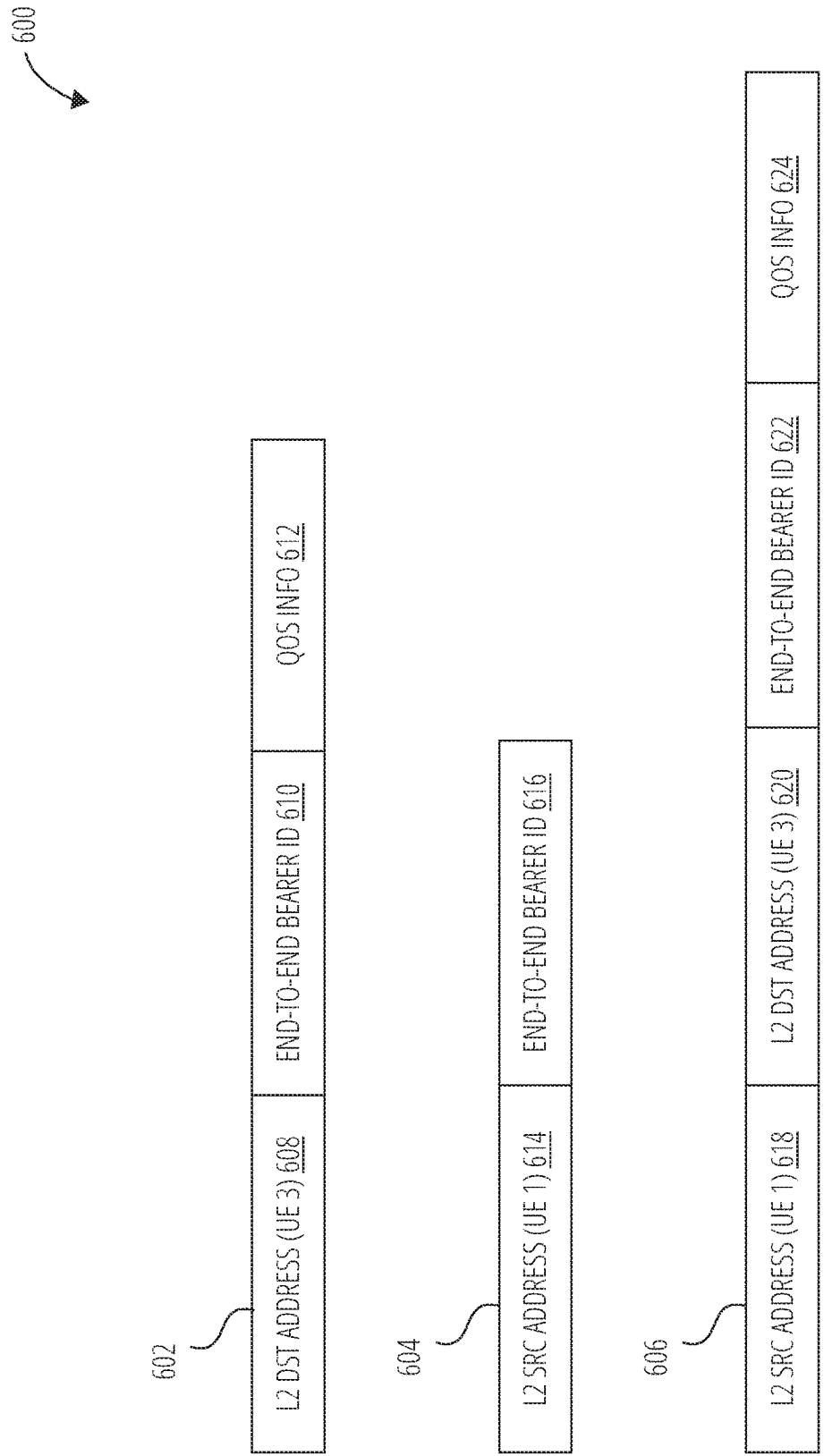
FIG. 6 illustrates various possible adaptation headers that may be used according to some embodiments.

FIG. 6 illustrates various possible adaptation headers 600 that may be used according to some embodiments. The possible adaptation headers 600 may be used as part of the first approach. The possible adaptation headers 600 include a first hop adaptation header format 602. The first hop adaptation header format 602 may be sent to a relay UE from a source remote UE (or a prior relay UE) in a data packet that contains data that is to be forwarded by the relay UE. The first hop adaptation header format 602 includes a Layer 2 destination address field 608, an end-to-end bearer field 610, and a QoS information field 612, each of which may be an example of routing information as discussed herein. A relay UE that receives the first hop adaptation header format 602 may use the Layer 2 destination address field 608 and the end-to-end bearer ID field 610 to identify how to forward data of interest (e.g., a PDCP PDU) from a received data packet according to the UE to UE relay on a corresponding outgoing data packet. Further, the relay UE may use the QoS information field 612 to identify with what QoS to send the corresponding outgoing data packet. In some embodiments, when the relay UE, receives traffic from a prior relay UE, the first-hop adaptation header may include a Layer 2 address of the source remote UE. In some embodiments, when the relay UE receives traffic from a source remote UE, the first-hop adaptation header may include a Layer 2 source address of the source remote UE, so that this information can be handily retrieved by the adaptation layer (instead of being retrieved from the MAC header).

The possible adaptation headers 600 include a second hop adaptation header format 604. The second hop adaptation header format 604 may be sent to a destination remote UE from a relay UE in a data packet that contains data of interest (e.g., data in a PDCP PDU of the data packet) that is to be used at the destination remote UE. The second hop adaptation header format 604 includes a Layer 2 source address field 614 and an end-to-end bearer ID field 616, each of which may be an example of routing information as discussed herein. The Layer 2 source address field 614 and the end-to-end bearer ID field 616 may be used by the destination remote UE to identify the UE from which the data of interest to be used from the data packet originated. A Layer 2 destination address and/or QoS information field may not be necessary in this case, as the data of interest has arrived at its destination. As discussed above, an LCID may be used by the destination remote UE to determine that the received data is for use at the destination remote UE (and not to be further relayed). Alternatively, another version of the second hop adaptation header format 604 may include the Layer 2 destination address field (with the Layer 2 address of the destination remote UE) that may then be used by the destination remote UE to determine that the data received is for use at the destination remote UE (and not to be further relayed).

The possible adaptation headers 600 include a unified adaptation header format 606. In some embodiments, it may be determined to be more straightforward to use a format according to the unified adaptation header format 606 in every data packet used in the UE to UE relay (rather than differentiate between, e.g., the use cases of the first hop adaptation header format 602 and the second hop adaptation header format 604). Accordingly, the unified adaptation header format 606 includes all of the previously discussed fields of the possible adaptation headers 600 in an adaptation header, including a Layer 2 source address field 618, a Layer 2 destination address field 620, an end-to-end bearer ID field 622, and a QoS information field 624 (each of which may be an example of routing information as discussed herein), each used (as necessary) at each UE of the UE to UE relay.

TABLE 1

| Destination | Forwarding Interface |
| --- | --- |
| No adaptation header | Pass to PCDP layer of the relay UE |
| L2 Dst ID = L2 ID of relay UE | Pass to PCDP layer of the relay UE |
| L2 Dst ID = L2 ID of destination remote UE end-to-end bearer ID = x | Find corresponding PCS link using Layer 2 address of destination remote UE and the end-to-end bearer ID, form necessary adaptation header, and forward data in a new packet using the necessary adaptation header along the UE to UE relay |

Table 1 illustrates the functionalities of a relay UE according to the first approach just described. If no adaptation header is included in a packet received at the relay UE, the relay UE determines that it was the ultimate destination of the data of interest (e.g., a PDCP PDU), and passes the data packet containing this data through to a PDCP layer of the relay UE for decoding and further use. In other cases, if the adaptation header includes a Layer 2 destination address field and the value in that field is a Layer 2 address of the relay UE, the relay UE determines that it was the ultimate destination of the data of interest (e.g., a PDCP PDU), and passes the data packet containing this data through to a PDCP layer of the relay UE for decoding and further use.

In other cases, if the adaptation header includes a Layer 2 destination address field and the value in that field is an address of a destination remote UE, the relay UE may then use the address of the destination remote UE and a bearer ID value from an end-to-end bearer ID field to determine a PC5 link to forward the data of interest toward the destination remote UE in a data packet that also includes an appropriate adaptation header (with appropriate routing information, as described above) that the relay UE forms for this purpose.

Note that because a pair of UEs may communicate using more than one end-to-end bearer, and because end-to-end bearer IDs may not be global IDs (but instead may be understood as an ID that may be unique only as between a given pair of UEs) it may be necessary to include both the end-to-end bearer ID field and a Layer 2 address for one of the UEs in order to make a complete forwarding determination as described above.

It is contemplated that the adaptation headers of the first approach could be used in embodiments involving more than one relay UE. In that case, an adaptation header of a first hop adaptation header format 602 may be sent by each relay UE (except a last relay UE, which may then send an adaptation header of a second hop adaptation header format 604). In other such embodiments, an adaptation header of the unified adaptation header format 606 may be used in every case. Further, QoS information (e.g., remaining QoS information) may need to be updated to account for each hop, in the manner described above.

A second approach may be a per-bearer approach that leverages implicit indications according to pre-established hop by hop path configurations. As introduced above, in order to use such a per-bearer implicit approach, it may be necessary to first establish the hop by hop path configurations. The establishment of the hop by hop path configurations may correspond to performing the hop by hop path configurations 216 discussed above in relation to FIG. 2.

It may be that using such an implicit, per-bearer approach according to hop by hop path configurations may reduce the amount of data (and therefore processing resources needed to interpret and/or use such data) in an adaptation header as compared to methods using the one or more of the possible adaptation headers 600 according to the first approach. For example, in the second approach, the adaptation header may contain only an index value, as opposed to the (perhaps larger and multiple) values discussed in adaptation headers according to the first approach (e.g., the possible adaptation headers 600).

A UE may need to send data in one or more data packets along a UE to UE relay, and those data packets may need to be sent according to a certain LCID (which may represent the QoS priority or treatment of the packet). Each UE may review its current direct bearers (e.g., DRBs) with the next UE in the UE to UE relay and determine whether a new direct bearer needs to be established (either because there is not a direct bearer between the UEs currently established, or because the direct bearers that are established between the UEs do not have an appropriate LCID to meet the QoS priority or treatment for the data in question), or whether a current direct bearer will suffice for that hop of the UE to UE relay for that data.

Figure 7:
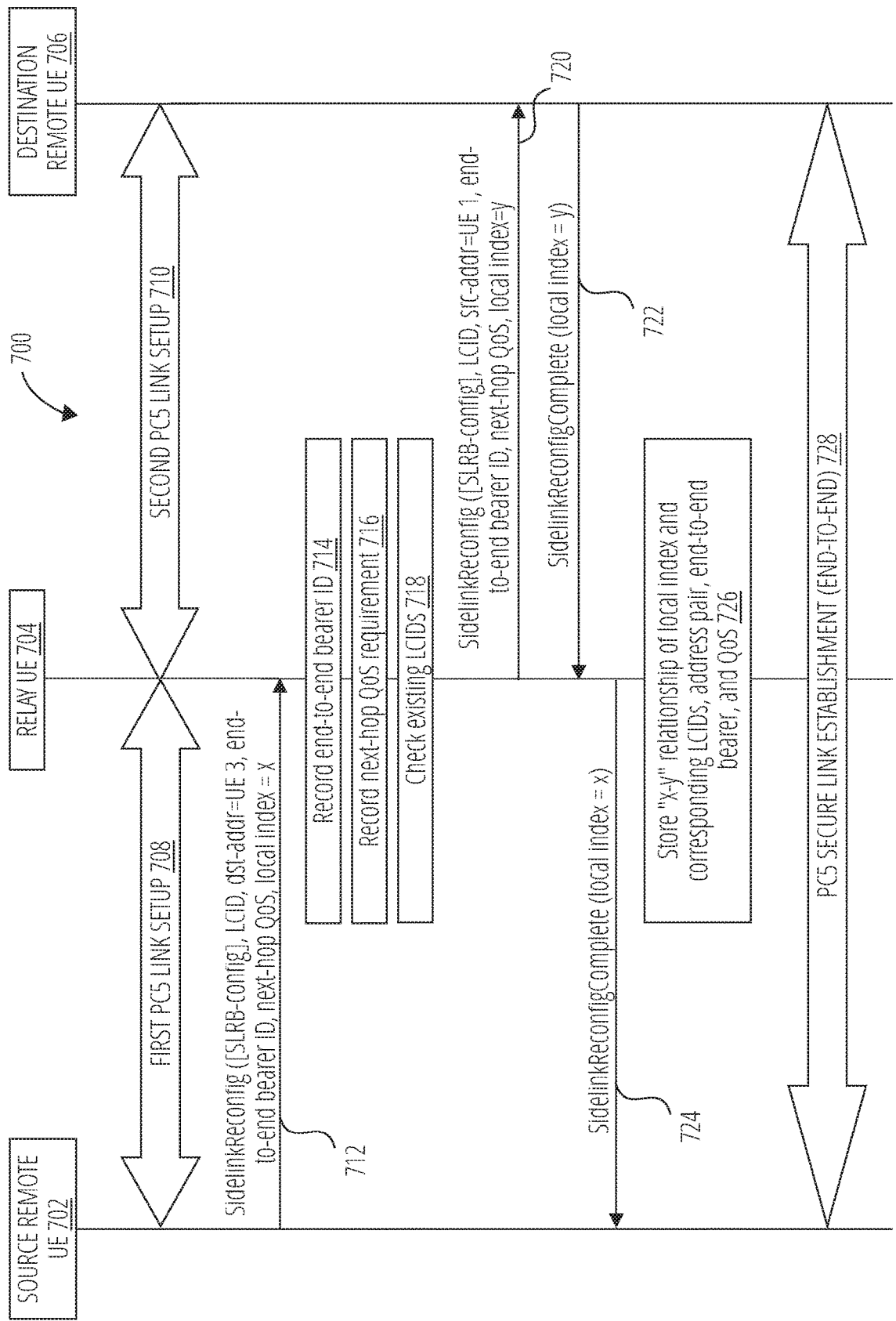
FIG. 7 illustrates a method for setting up hop by hop path configurations from a source remote UE to a destination remote UE through a relay UE, according to an embodiment.

FIG. 7 illustrates a method 700 for setting up hop by hop path configurations from a source remote UE 702 to a destination remote UE 706 through a relay UE 704, according to an embodiment. The method 700 includes performing a first PC5 link setup 708 and a second PC5 link setup 710. This may be done in the manner described above in relation to, for example, performing the first PC5 link setup 212 and second PC5 link setup 214 of FIG. 2.

The method 700 further includes sending a message 712 between the source remote UE 702 and the relay UE 704. The message 712 may be an SL configuration message such as a "SidelinkReconfig" message or some other message configured to carry the illustrated parameters. The parameters of the message 712 may include an SLRB-config, which may indicate new bearer configuration information regarding a newly set up (by the source remote UE 702) direct bearer between the source remote UE 702 and the relay UE 704. This parameter may be optional, in that it may only be present if a new such direct bearer is being established (rather than an already existing direct bearer between the source remote UE 702 and the relay UE 704 being reused, as described above) for use according to this hop by hop path configuration. The parameters of the message 712 further include an LCID, which corresponds to the QoS priority or treatment with which data will be sent by the source remote UE 702 on this bearer, and may further be used (as described below) for identifying data to this hop by hop path configuration. The message 712 further includes a destination address parameter, which indicates to the relay UE 704 the ultimate destination (e.g., the destination remote UE) of data sent according to this hop by hop path configuration (e.g., using a Layer 2 address of the ultimate destination). The message 712 further includes an end-to-end bearer ID that indicates to the relay UE 704 the end-to-end bearer that corresponds to this hop by hop path configuration. The message 712 further includes a next-hop QoS, which allows the relay UE 704 to determine the QoS priority or treatment that should be given to data sent according to this hop by hop path configuration on a next hop. The next-hop QoS included in the message 712 may be an explicit indication of the QoS priority or treatment that should be given such data. Alternatively, the next-hop QoS included in the message 712 may be an indication of a general (static) QoS priority or treatment that should be used for all data on this hop by hop path configuration. Finally, the message 712 may further include an index that may be used to uniquely identify the hop between the source remote UE 702 and the relay UE 704 within this hop by hop path configuration. In other words, the index uniquely identifies the use of this direct bearer as within this particular hop by hop path configuration (as opposed to, e.g., the use of the same direct bearer as within a different hop by hop path configuration).

The method 700 further includes recording 714, at the relay UE 704, the end-to-end bearer ID corresponding to this hop by hop path configuration received in the message 712. The method 700 further includes recording 716, at the relay UE 704, next-hop QoS requirement corresponding to the next hop of this hop by hop path configuration received in the message 712.

The method 700 further includes checking 718 any existing LCIDs of direct bearers between the relay UE 704 and the destination remote UE 706 to see whether such bearers meet the next-hop QoS requirements for the hop of this hop by hop path configuration between the relay UE 704 and the destination remote UE 706.

The method 700 further includes sending a message 720 between the relay UE 704 and the destination remote UE 706. The message 720 may be a sidelink configuration message such as a "SidelinkReconfig" message or some other message configured to carry the illustrated parameters. The parameters of the message 720 may include an SLRB-config, which may indicate new bearer configuration information regarding a newly set up (by the relay UE 704) bearer between the relay UE 704 and the relay destination remote UE 706. This parameter may be optional, in that it may only be present if a new such bearer is being established for use according to this hop by hop path configuration (rather than, for example, the case where the relay UE 704 instead decides to re-use an existing direct bearer between the relay UE 704 and the destination remote UE 706 in the case that an LCID of the existing direct bearer met the next-hop QoS requirement for this hop of the hop by hop path configuration, which the relay UE 704 checked as described above in checking 718). The parameters of the message 720 further include an LCID, which corresponds to the QoS priority or treatment with which data will be sent by the relay UE 704 on this bearer, and will further be used (as described below) for identifying data to this hop by hop path configuration. This LCID may be selected based on the next-hop QoS indicator received from the source remote UE 702. The message 720 further includes a destination address parameter, which indicates to the destination remote UE 706 the ultimate destination of data sent according to this hop by hop path configuration (e.g., using a Layer 2 address of the ultimate destination of the data, which may be a Layer 2 address of the destination remote LIE 706). The message 720 further includes an end-to-end bearer ID that indicates to the relay destination remote UE 706 the end-to-end bearer that corresponds to this hop by hop path configuration. This end-to-end bearer ID is the same end-to-end bearer ID that was sent to the relay UE 704 by the source remote UE 702. The message 720 further includes a next-hop QoS, which allows the destination remote UE 706 to determine the QoS priority or treatment that should be given to data sent according to this hop by hop path configuration on a next hop (in the case that the relay UE 704 does not realize that the destination remote UE 706 is the destination, but note that including this information would also be of use in the case where the relay UE 704 is instead setting up a hop by hop path configuration with another relay UE rather than the destination remote UE 706). The next-hop QoS included in the message 720 may be an explicit indication of the QoS priority or treatment that should be given such data. Alternatively, the next-hop QoS included in the message 720 may be an indication of a general (static) QoS priority or treatment that should be used for all data on this hop by hop path configuration. Finally, the message 720 may further include an index that may be used to uniquely identify the hop between the relay UE 704 and the destination remote UE 706 within this hop by hop path configuration. In other words, the index uniquely identifies the use of this direct hearer as within this particular hop by hop path configuration (as opposed to, e.g., the use of the same direct bearer as within a different hop by hop path configuration). Because this index is local to the direct bearer of the relay UE 704 and the destination remote UE 706, the value of the index between the source remote UE 702 and the relay UE 704 has no bearing on its value.

To confirm the portion of the hop by hop path configuration between the relay UE 704 and destination remote UE 706 that uses this direct bearer between the relay UE 704 and the destination remote UE 706, the destination remote UE 706 sends an SL reconfiguration complete message 722 such as a "SidelinkReconfigComplete" message, or some other message. The message 722 may include the index identifying the hop of the hop by hop path configuration between the relay UE 704 and the destination remote UE 706.

Then, to confirm the setup of the portion of the hop by hop path configuration between the source remote UE 702 and the relay UE 704 that uses the (other) direct bearer between the source remote UE 702 and the relay UE 704, the relay UE 704 sends an SL reconfiguration complete message 724 such as a "SidelinkReconfigComplete" message, or some other message. The message 724 may include the (other) index identifying the hop of the hop by hop path configuration between the source remote UE 702 and the relay UE 704.

The method 700 further includes storing 726, at the relay UE 704, the correspondence or mapping between the indexes (e.g., storing information that each of the indexes discussed above is part of the same hop by hop path configuration); storing the relationships between each index and its corresponding LCID; storing a mapping between the Layer 2 address of the source remote UE 702 and the Layer 2 address of the destination remote UE 706 corresponding to this hop by hop path configuration; storing the end-to-end bearer ID corresponding to this hop by hop path configuration; and storing QoS information regarding one or both of the hops of this hop by hop path configuration.

The method 700 then proceeds to perform a PC5 secure link establishment (end-to-end) 728, which may correspond to the end-to-end PC5 link setup (control plane) 218 of FIG. 2.

It is contemplated that the method 700 could be extended to include multiple relay UEs (more than just the relay UE 704). In these instances, each relay UE may receive a message analogous to the message 712 from a prior UE in the UE to UE relay; perform operations analogous to the recording 714, the recording 716, and the checking 718; send a message analogous to the message 720 to the next UE in the UE to UE relay; receive a message analogous to the message 722 from the next UE in the UE to UE relay; send a message analogous to the message 724 back to the prior UE in the UE to UE relay; and perform the operations analogous to the storing 726.

It is further contemplated that analogous information as was sent in the message 712 and the message 720 can be sent in return on the message 722 and the message 724 (e.g., an SL configuration message such as the illustrated "SidelinkReconfig" messages of the message 712 and the message 720 can be sent on the message 722 and the message 724, perhaps with additional confirmatory signaling then added to the method 700). This may allow for the configuration of a second hop by hop path configuration that is the reverse of the first using only a single messaging method. For example, in the method 700 illustrated in FIG. 7, the support of data forwarding setup is for the directional end-to-end PDCP bearer from source remote UE 702 to the destination remote UE 706. If there is another directional bearer from the destination remote UE 706 to the source remote UE 702, then an analogous set of configuration parameters can be included in the "SidelinkReconfigComplete" message or any other sort of message used for similar purposes. Then, with a single round-trip, a data forwarding setup can be achieved for traffic in both directions between the source remote UE 702 and the destination remote UE 706.

It is also further contemplated that multiple hop by hop path configurations may be achieved in one messaging round trip by including duplicates of the discussed information (relative to each individual hop by hop path configuration) in each of the message 712, the message 720, the message 722, and the message 724. For example, if there are multiple end-to-end PDCP bearers to be set up from the source remote UE 702 to the destination remote UE 706, an array of configurations, one for each of the multiple PDCP bearers, can be included in the "SidelinkReconfig" message or any other sort of messages used for similar purposes.

Once a hop by hop path configuration as described above is set up, a per-bearer, implicit approach for UE to UE relay may be accomplished. In this approach, the LCID value placed in a data packet may be used to distinguish data packets terminated at the receiving UE and any data packets to be forwarded on to, for example, a destination remote UE or another relay UE. This means that there may be multiple usable LCID values for a single QoS priority or treatment, one of which is used to indicate a data packet terminated at the receiving UE, and another of which is used to indicate that a data packet is to be forwarded along the UE to UE relay. Under this approach, a UE may use PQI to SLRB mapping to classify traffic into different logical channels.

The index value for the particular hop being used in the particular the hop by hop path configuration being used is placed into an adaptation header of the data packet to be sent.

Once received at the receiving UE, the LCID value, the index value, and a Layer 2 source address of the sending UE (from, e.g., the MAC header, as in the source UE Layer 2 address 404 of FIG. 4 and the source UE Layer 2 address 504 of FIG. 5) are used at each receiving UE on the UE to UE relay (whether it be a relay UE or a destination remote UE) to determine the necessary forwarding configuration (or not) for the data of interest in the received data packet.

Figure 8:
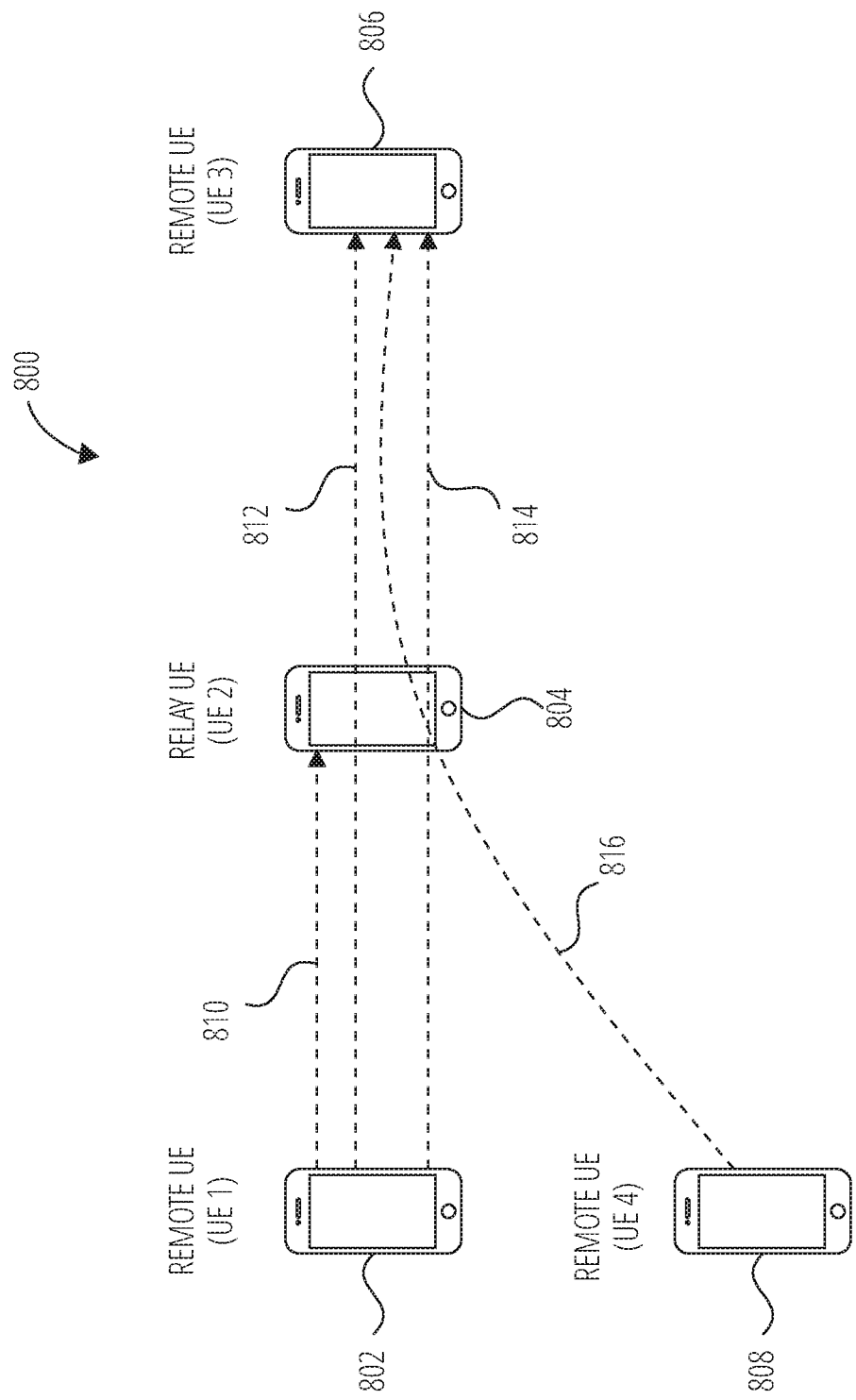
FIG. 8 is a diagram illustrating the use of a data forwarding method according to a per-bearer approach of some embodiments.

FIG. 8 is a diagram 800 illustrating the use of a data forwarding method according to a per-bearer approach of some embodiments. The diagram 800 includes a first remote UE 802 (labeled as "UE 1" in FIG. 8), a relay UE 804 (labeled as "UE 2" in FIG. 8), a second remote UE 806 (labeled as "UE 3" in FIG. 8), and a third remote UE 808 (labeled as "UE 4" in FIG. 8). A first hop by hop path configuration 810 has been established between the first remote UE 802 and the relay UE 804. A second hop by hop path configuration 812 has been established between the first remote UE 802 and the second remote UE 806. A third hop by hop path configuration 814 has been established between the first remote UE 802 and the second remote UE 806. A fourth hop by hop path configuration 816 has been established between the third remote UE 808 and the second remote UE 806. Each of these hop by hop path configurations may have been established using the methods disclosed in relation to FIG. 7 above.

TABLE 2

| Ingress | Egress |
| --- | --- |
| L2 Src ID = UE 1, LCID = 0 | N/A, pass up to PDCP of UE 2 |
| L2 Src ID = UE 1, LCID = 1, index = 1 | L2 Dst ID = UE 3, LCID = 1, index = 5 |
| L2 Src ID = UE 1, LCID = 2, index = 2 | L2 Dst ID = UE 3, LCID = 1, index = 6 |
| L2 Src ID = UE 4, LCID = 4, index = 1 | L2 Dst ID = UE 3, LCID = 3, index = 1 |

Table 2 illustrates the ingress and egress treatment of data of interest in a data packet received at the relay UE 804. For example, if a data packet is received with a certain LCID indicating the data is not to be forwarded (e.g., LCID=0), the data of interest is decoded by the PDCP layer of the relay UE 804. This is the first row of Table 2 as applied to the first hop by hop path configuration 810 of FIG. 8.

In other cases, a data packet may be received at the relay UE 804 with an LCID that indicates that the data of interest should be forwarded (e.g., LCID≠0), and an index in an adaptation header that corresponds to the particular hop of the particular hop by hop path configuration that was used to send the data packet. The relay UE 804 may then refer to the index and LCID that was saved during the setup of the particular hop by hop path configuration to identify the hop by hop path configuration that corresponds to the received data packet, and to further determine that the data of interest from the data packet should be packaged into another (outgoing) data packet and sent on a next hop (according to its corresponding index) of the particular hop by hop path configuration. Accordingly, the relay UE 804 may generate a data packet containing the data of interest that contains an LCID and an index value in an adaptation header that corresponds to the next hop in the particular hop by hop path configuration as was determined during the hop by hop path configuration setup. This data packet is then sent by the relay UE 804 on the direct bearer corresponding to that particular hop of the particular hop by hop path configuration.

For example, as in the second row of Table 2, the relay UE 804 may receive a data packet from the first remote UE 802 with LCID=1 and index (from the adaptation header)=1. This may correspond to an incoming hop of the second hop by hop path configuration 812 that maps to an outgoing hop of the second hop by hop path configuration 812 that uses a mapped-to direct bearer with an LCID of 1 and an index (in the adaptation header) of 5 to send the data of interest to the second remote UE 806. Accordingly, the relay UE 804 prepares a corresponding data packet, places within it the data of interest, and forwards it to the second remote UE 806 on the mapped-to direct bearer.

As another example, as in the third row of Table 2, the relay UE 804 may receive a data packet from the first remote UE 802 with LCID=2 and index (from the adaptation header)=2. This may correspond to an incoming hop of the third hop by hop path configuration 814 that maps to an outgoing hop of the third hop by hop path configuration 814 that uses a mapped-to direct bearer with an LCID of 1 and an index (in the adaptation header) of 5 to send the data of interest to the second remote UE 806. Accordingly, the relay UE 804 prepares a corresponding data packet, places within it the data of interest, and forwards it to the second remote UE 806 on the mapped-to direct bearer.

As another example, as in the fourth row of Table 2, the relay UE 804 may receive a data packet from the third remote UE 808 with LCID=4 and index (from the adaptation header)=1. This may correspond to an incoming hop of the fourth hop by hop path configuration 816 that maps to an outgoing hop of the fourth hop by hop path configuration 816 that uses a mapped-to direct bearer with an LCID of 3 and an index (in the adaptation header) of 1 to send the data of interest to the second remote UE 806. Accordingly, the relay UE 804 prepares a corresponding data packet, places within it the data of interest, and forwards it to the second remote UE 806 on the mapped-to direct bearer.

It is contemplated that embodiments according to this second approach could be extended to include devices other than UEs, such as base stations (in which case the method would be considered to function in a UE to NW relay context).

A third approach may also be a per-bearer approach that leverages implicit indications according to pre-established hop by hop path configurations. The third approach may be different than the second approach, in that in at least some circumstances, it may be that there is a wide enough range of LCID values available for use that an LCID value can itself be configured to provide a routing indication (without interfering with the necessary communication of QoS information in the LCID values within the wireless communication system). This may be the case when there are not too many UEs involved in UE to UE relay operations within the wireless communication system. In this case, an index may not be required (as an LCID value can make an analogous indication), and so an adaptation header may not be required and may be omitted, granting even further gains to signaling efficiency.

A UE may need to send data in one or more data packets along a UE to UE relay, and those data packets may need to be sent according to a certain LCID (which may represent the QoS priority or treatment of the packet). Each UE, may review its current direct bearers (e.g., DRBs) with the next UE in the UE to UE relay and determine whether a new direct bearer needs to be established (either because there is not a direct bearer established, or because the direct bearers that are established do not have an appropriate LCID to meet the QoS priority or treatment for the data in question), or whether a current direct bearer will suffice for that hop of the UE to UE relay for that data.

Figure 9:
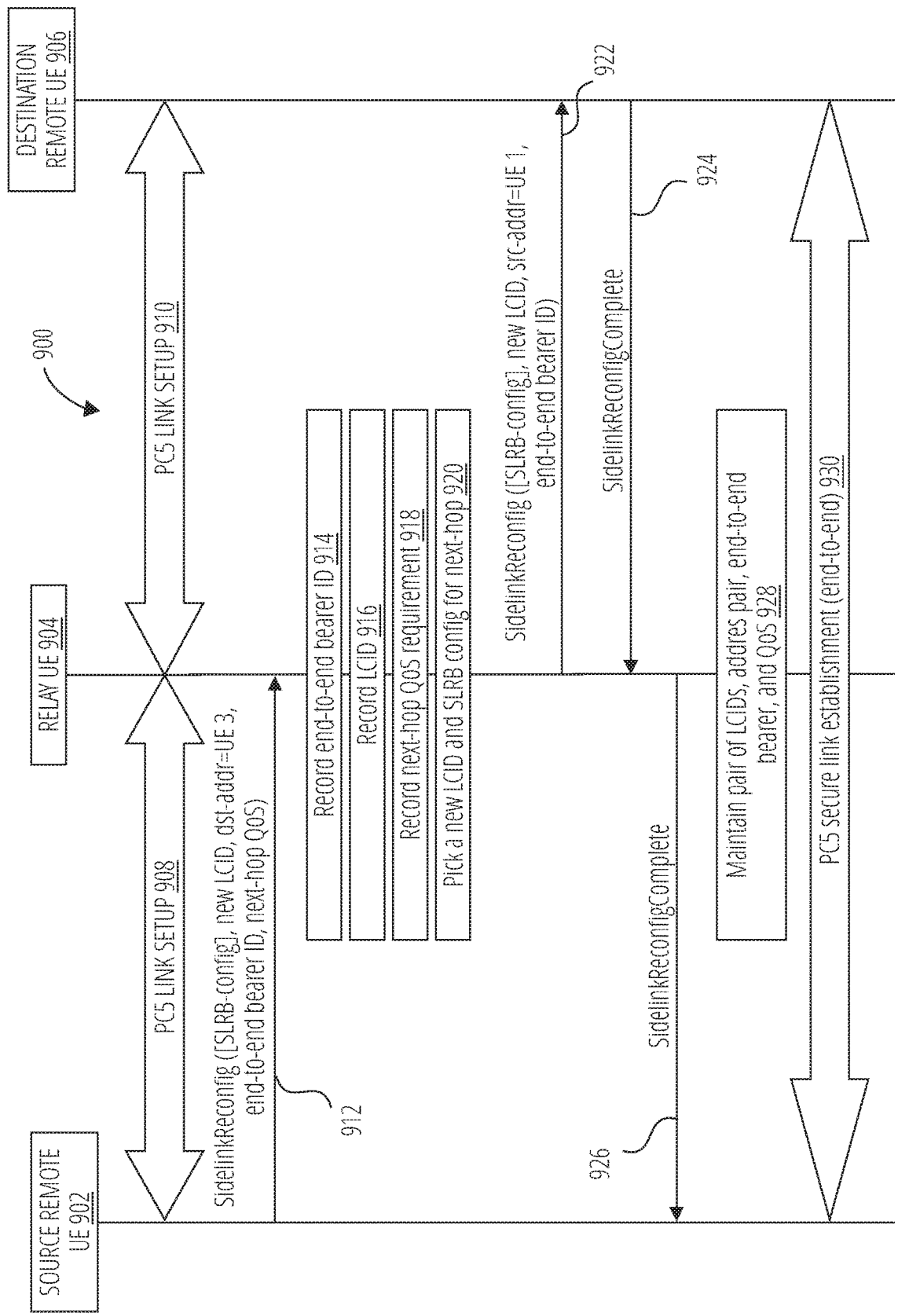
FIG. 9 illustrates a method for setting up hop by hop path configurations from a source remote UE to a destination remote UE through a relay UE, according to an embodiment.

FIG. 9 illustrates a method 900 for setting up hop by hop path configurations from a source remote UE 902 to a destination remote UE 906 through a relay UE 904, according to an embodiment. The method 900 includes performing a first PC5 link setup 908 and a second PC5 link setup 910. This may be done in the manner described above in relation to, for example, performing the first PC5 link setup 212 and the second PC5 link setup 214 of FIG. 2.

The method 900 further includes sending a message 912 between the source remote UE 902 and the relay UE 904. The message 912 may be an SL configuration message such as a "SidelinkReconfig" message or some other message configured to carry the illustrated parameters. The parameters of the message 912 may include an SLRB-config, which may indicate new bearer configuration information regarding a newly set up (by the source remote UE 902) direct bearer between the source remote UE 902 and the relay UE 904. This parameter may be optional, in that it may only be present if a new such direct bearer is being established (rather than an already existing direct bearer between the source remote UE 902 and the relay UE 904 being reused, as described above) for use according to this hop by hop path configuration. The parameters of the message 912 further include an LCID, which corresponds to the QoS priority or treatment with which data will be sent by the source remote UE 902, on this direct bearer. The LCID may also provide (e.g., represent, due to the particular value of LCID selected) a routing indication used to instruct the relay UE 904 sufficiently to identify the next direct bearer of the corresponding hop by hop path configuration. The message 912 further includes a destination address parameter, which indicates to the relay UE 904 the ultimate destination (e.g., the destination remote UE) of data sent according to this hop by hop path configuration (e.g., using a Layer 2 address of the ultimate destination). The message 912 further includes an end-to-end bearer ID that indicates to the relay UE 904 the end-to-end bearer that corresponds to this hop by hop path configuration. The message 912 further includes a next-hop QoS, which allows the relay UE 904 to determine the QoS priority or treatment that should be given to data sent according to this hop by hop path configuration on a next hop. The next-hop QoS included in the message 912 may be an explicit indication of the QoS priority or treatment that should be given such data. Alternatively, the next-hop QoS included in the message 912 may be an indication of a general (static) QoS priority or treatment that should be used for all data on this hop by hop path configuration.

The method 900 further includes recording 914, at the relay UE 904, the end-to-end bearer ID corresponding to this hop by hop path configuration received in the message 912. The method 900 further includes recording 916, at the relay UE 904, the LCAD corresponding to the previous hop of the hop by hop path configuration received in the message 912. The method 900 further includes recording 918, at the relay UE 904, a next-hop QoS requirement corresponding to the next hop of this hop by hop path configuration received in the message 912. The method 900 further includes picking a new LCID for the next-hop that meets the next-hop QoS requirement (and, if necessary, a new SLRB configuration for a direct bearer for the next hop that meets this LCID, if such a direct bearer between the relay UE 904 and the destination remote UE 906 does not already exist; otherwise, an existing direct bearer that meets this LCID may be used instead).

The method 900 further includes sending a message 922 between the relay UE 904 and the destination remote UE 906. The message 922 may be a sidelink configuration message such as a "SidelinkReconfig" message or some other message configured to carry the illustrated parameters. The parameters of the message 922 may include an SLRB-config, which may indicate new hearer configuration information regarding a newly set up (by the relay UE 904) bearer between the relay UE 904 and the relay destination remote UE 906. This parameter may be optional, in that it may only be present if a new such direct bearer is being established for use according to this hop by hop path configuration (rather than, for example, the case where the relay UE 904 instead decides to re-use an existing direct bearer between the relay UE 904 and the destination remote UE 906 in the ease that an LCID of the existing direct bearer met the next-hop QoS requirement for this hop of the hop by hop path configuration, which the relay UE 904 checked as described above in picking 920). The parameters of the message picking 920 further include an LCID, which corresponds to the QoS priority or treatment with which data will be sent by the relay UE 704 on this bearer. This LCID may be selected based on the next-hop QoS indicator received from the source remote UE 902. The LCID may also provide (e.g., represent, due to the particular value of LCID selected) a routing indication used to instruct the destination remote UE 906 sufficiently to identify data to this hop by hop path configuration. The message 922 further includes a destination address parameter, which indicates to the destination remote UE 906 the ultimate destination of data sent according to this hop by hop path configuration (e.g., using a Layer 2 address of the ultimate destination of the data, which may be a Layer 2 address of the destination remote UE 906). The message 922 further includes an end-to-end bearer ID that indicates to the destination remote UE 906 the end-to-end bearer that corresponds to this hop by hop path configuration. This end-to-end bearer ID is the same end-to-end bearer ID that was sent to the relay UE 904 by the source remote UE 902. The message 912 further includes a next-hop QoS, which allows the relay UE 904 to determine the QoS priority or treatment that should be given to data sent according to this hop by hop path configuration on a next hop (in the case that the relay UE 904 does not realize that the destination remote UE 906 is the destination, but note that this information would also be of use in the case where the relay UE 904 is instead setting up a hop by hop path configuration with another relay UE rather than the destination remote UE 906). The next-hop QoS included in the message 912 may be an explicit indication of the QoS priority or treatment that should be given such data. Alternatively, the next-hop QoS included in the message 912 may be an indication of a general (static) QoS priority or treatment that should be used for all data on this hop by hop path configuration.

To confirm the portion of the hop by hop path configuration between the relay UE 904 and destination remote UE 906 that uses this direct bearer between the relay UE 904 and the destination remote UE 906, the destination remote UE 906 sends an SL reconfiguration complete message 924 such as a "SidelinkReconfigComplete" message, or some other message.

Then, to confirm the setup of the portion of the hop by hop path configuration between the source remote UE 902 and the relay UE 904 that uses the (other) direct bearer between the source remote UE 902 and the relay UE 904, the relay UE 904 sends an SL reconfiguration complete message 926 such as a "SidelinkReconfigComplete" message, or some other message.

The method 900 further includes maintaining 928, at the relay UE 904, the correspondence or mapping between LCID pairs, storing a mapping between the Layer 2 address of the source remote UE 902 and the Layer 2 address of the destination remote UE 906 corresponding to this hop by hop path configuration, storing the end-to-end bearer ID corresponding to this hop by hop path configuration, and storing QoS information regarding one or both of the hops of this hop by hop path configuration.

The method 900 then proceeds to perform a PC5 secure link establishment (end-to-end) 930, which may correspond to the end-to-end PC5 link setup (control plane) 218 of FIG. 2.

It is contemplated that the method 900 could be extended to include multiple relay UEs (more than just the relay UE 904). In these instances, each relay UE may receive a message analogous to the message 912 from a prior UE in the UE to UE relay; perform operations analogous to the recording 914, the recording 916, the recording 918, and the picking 920; send a message analogous to the message 922 to the next UE in the UE to UE relay; receive a message analogous to the message 924 from the next UE in the UE to UE, relay; and send a message analogous to the message 926 back to the prior UE in the UE to UE relay, and perform the operations analogous to the maintaining 928.

It is further contemplated that analogous information as was sent in the message 912 and the recording message 922 can be sent in return on the message 924 and the message 926 (e.g., an SL configuration message such as the illustrated "SidelinkReconfig" messages of the message 912 and the message 922 can be sent on the message 924 and the message 926, perhaps with additional confirmatory signaling then added to the method 900). This may allow for the configuration of a second hop by hop path configuration that is the reverse of the first using only a single messaging method.

It is also further contemplated that multiple hop by hop path configurations may be achieved in one messaging round trip by including duplicates of the discussed information (relative to each individual hop by hop path configuration) in each of the message 912, the message 922, the message 924, and the message 926.

Once a hop by hop path configuration as described above is set up, a per-bearer, implicit approach for UE to UE relay may be accomplished. In this approach, the LCID value within received data packets may provide a routing indication that may be used distinguish a data packet terminated at the receiving UE and any data packets to be forwarded on to, for example, a destination remote UE or another relay UE. Such a routing indication under the third approach may also distinguish a direct bearer to use on a next hop of a hop by hop path configuration.

Once received at the receiving UE, the LCID value and a Layer 2 source address of the sending UE (from, e.g., the MAC header, as in the source UE Layer 2 address 404 of FIG. 4 and the source UE Layer 2 address 504 of FIG. 5) are used at each receiving UE on the UE to UE relay (whether it be a relay UE or a destination remote UE) to determine the necessary forwarding configuration (or not) for the data of interest in the received data packet.

Figure 10:
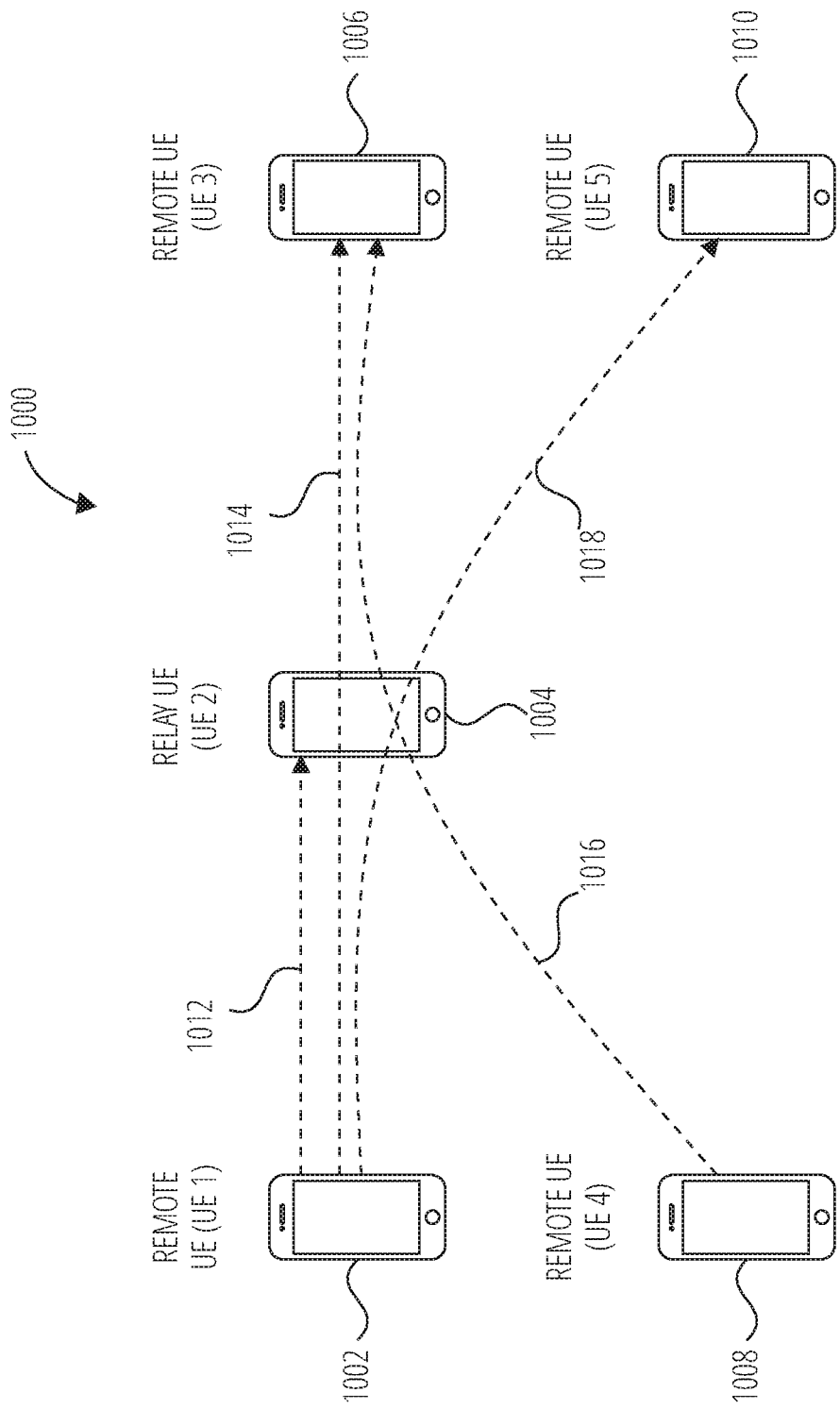
FIG. 10 is a diagram illustrating the use of a data forwarding method according to a per-bearer approach of some embodiments.

FIG. 10 is a diagram 1000 illustrating the use of a data forwarding method according to a per-bearer approach of some embodiments. The diagram 1000 includes a first remote UE 1002 (labeled as "UE 1" in FIG. 10), a relay UF 1004 (labeled as "UE 2" in FIG. 10), a second remote UE 1006 (labeled as "UE 3" in FIG. 10), a third remote UE 1008 (labeled as "UE 4" in FIG. 10), and a fourth remote UE 1010 (labeled as "UE 5" in FIG. 10). A first hop by hop path configuration 1012 has been established between the first remote UF 1002 and the relay UE 1004. A second hop by hop path configuration 1014 has been established between the first remote UE 1002 and the second remote UE 1006. A third hop by hop path configuration 1016 has been established between the third remote UE 1008 and the second remote UE 1006. A fourth hop by hop path configuration 1018 has been established between the first remote UE 1002 and the fourth remote UE 1010. Each of these hop by hop path configurations may have been established using the methods disclosed in relation to FIG. 9 above.

TABLE 3

| Ingress | Egress |
|---|---|
| L2 Src ID = UE 1, LCID = 0 | N/A, pass up to PDCP of UE 2 |
| L2 Src ID = UE 1, LCID = x | L2 Dst ID = UE 3, LCID = y |
| L2 Src ID = UE 4, LCID = p | L2 Dst ID = UE 3, LCID = q |
| L2 Src ID = UE 1, LCID = u | L2 Dst ID = UE 5, LCID = v |

Table 2 illustrates the ingress and egress treatment of data of interest in a data packet received at the relay UE 1004. For example, if a data packet is received with an LCID that provides a routing indication that the data of interest is not to be forwarded (e.g., LCID=0), the data of interest is decoded by the PDCP layer of the relay UE 1004. This is the first row of Table 2 as applied to the first hop by hop path configuration diagram 1000 of FIG. 10.

In other cases, a data packet may be received at the relay UE 1004 with an LCID that provides a routing indication that necessitates the forwarding of the data of interest in the data packet. The relay UE 1004 may then refer to the LCID that was saved during the setup of the particular hop by hop path configuration to identify the hop by hop path configuration that corresponds to the received data packet, and to further determine that the data of interest from the data packet should be packaged into another (outgoing) data packet and sent on a next hop of the particular hop by hop path configuration. Accordingly, the relay UE 1004 may generate a data packet containing the data of interest that contains an LC1D that corresponds to the next hop in the particular hop by hop path configuration as was determined during setup. This data, packet is then sent by the relay UE 1004 on the bearer corresponding to that particular hop of the particular hop by hop path configuration.

For example, as in the second row of Table 2, the relay UE 1004 may receive a data, packet from the first remote UE 1002 with LCID=x. This may correspond to an incoming hop of the second hop by hop path configuration 1014 that maps to an outgoing hop of the second hop by hop path configuration 1014 that uses a mapped-to direct bearer with an LCID of y to send the data of interest to the second remote UE 1006. Accordingly, the relay UE 1004 prepares a corresponding data packet, places within it the data of interest, and forwards it to the second remote UE 1006 on the mapped-to direct bearer.

As another example, as in the third row of Table 2, the relay UE 1004 may receive a data packet from the third remote UE 1008 with LCID=p. This may correspond to an incoming hop of the third hop by hop path configuration 1016 that maps to an outgoing hop of the third hop by hop path configuration 1016 that uses a mapped-to direct bearer with an LCID of q to send the data of interest to the second remote UE 1006. Accordingly, the relay UE 1004 prepares a corresponding data packet, places within it the data of interest, and forwards it to the second remote UE 1006 on the mapped-to direct bearer.

As another example, as in the fourth row of Table 2, the relay UE 1004 may receive a data packet from the first remote UE 1002 with LCID=u. This may correspond to an incoming hop of the fourth hop by hop path configuration 1018 that maps to an outgoing hop of the fourth hop by hop path configuration 1018 that uses a mapped-to direct bearer with an LCID of i to send the data of interest to the fourth remote UE 1010. Accordingly, the relay UE 1004 prepares a corresponding data packet, places within it the data of interest, and forwards it to the fourth remote UE 1010 on the mapped-to direct bearer.

It is contemplated that embodiments according to this third approach could be extended to include devices other than UEs, such as base stations (in which case the method would be considered to function in a UE to NW relay context).

Figure 11:
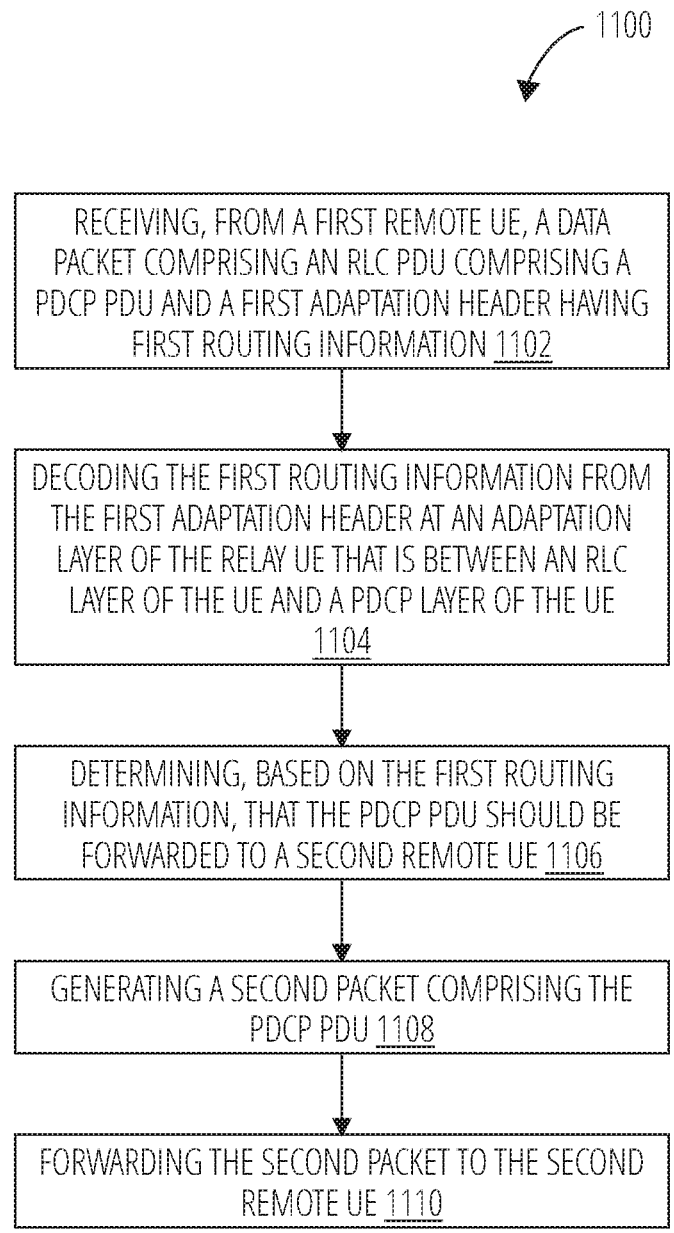
FIG. 11 illustrates a method of a relay UE, according to an embodiment.

FIG. 11 illustrates a method 1100 of a relay UE, according to an embodiment. The method 1100 includes receiving 1102, from a first remote UE, a data packet comprising an RLC PDU comprising a PDCP PDU and a first adaptation header having first routing information.

The method 1100 further includes decoding 1104 the first routing information from the first adaptation header at an adaptation layer of the relay UE that is between an RLC layer of the UE and a PDCP layer of the UE.

The method 1100 further includes determining 1106, based on the first routing information, that the PDCP PDU should be forwarded to a second remote UE.

The method 1100 further includes generating 1108 a second packet comprising the PDCP PDU.

The method 1100 further includes forwarding the second packet to the second remote UE.

Figure 12:
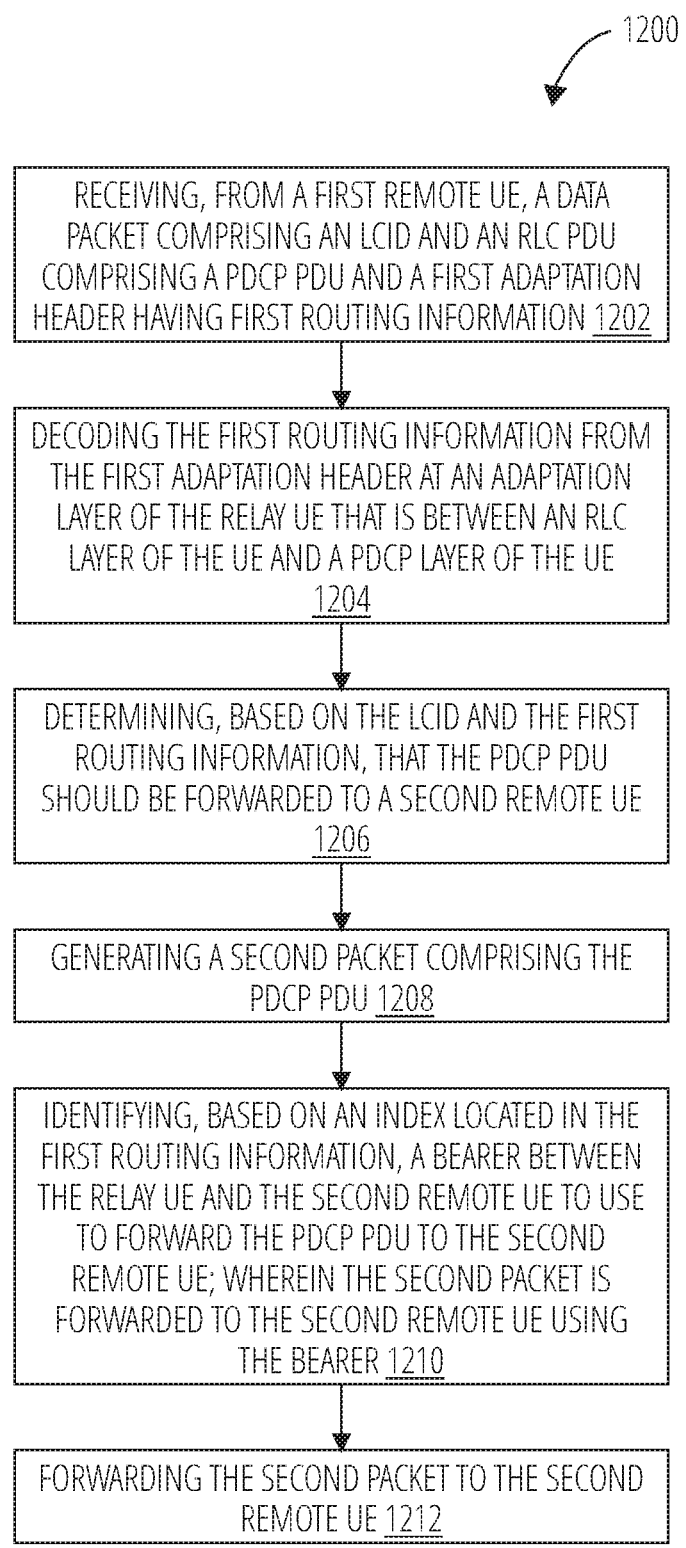
FIG. 12 illustrates a method of a relay UE, according to an embodiment.

FIG. 12 illustrates a method 1200 of a relay UE, according to an embodiment. The method 1200 includes receiving 1202, from a first remote UE, a data packet comprising an LCID and an RLC PDU comprising a PDCP PDU and a first adaptation header having first routing information.

The method 1200 further includes decoding 1204 the first routing information from the first adaptation header at an adaptation layer of the relay UE that is between an RLC layer of the UE and a PDCP layer of the UE.

The method 1200 further includes determining 1206, based on the LCID and the first routing information, that the PDCP PDU should be forwarded to a second remote UE.

The method 1200 further includes generating 1208 a second packet comprising the PDCP PDU.

The method 1200 further includes identifying 1210, based on an index located in the first routing information, a bearer between the relay UE and the second remote UE to use to forward the PDCP PDU to the second remote UE; wherein the second packet is forwarded to the second remote UE using the bearer.

The method 1200 further includes forwarding 1212 the second packet to the second remote UE.

Figure 13:
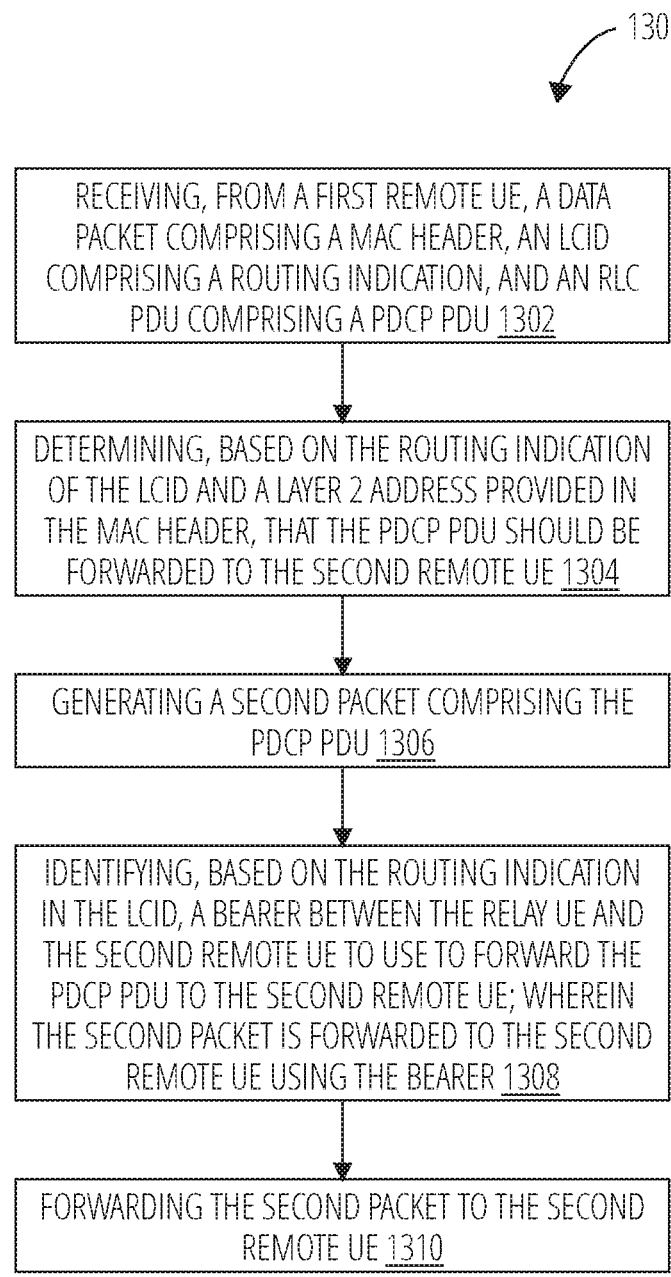
FIG. 13 illustrates a method of a relay UE, according to an embodiment.

FIG. 13 illustrates a method 1300 of a relay UE, according to an embodiment. The method 1300 includes receiving 1302, from a first remote UE, a data packet comprising a MAC header, an LCID comprising a routing indication, and an RLC PDU comprising a PDCP PDU.

The method 1300 further includes determining 1304, based on the routing indication of the LCID and a Layer 2 address provided in the MAC header, that the PDCP PDU should be forwarded to the second remote UE.

The method 1300 further includes generating 1306 a second packet comprising the PDCP PDU.

The method 1300 further includes identifying 1308, based on the routing indication in the LCID, a bearer between the relay UE and the second remote UE to use to forward the PDCP PDU to the second remote UE; wherein the second packet is forwarded to the second remote UE using the bearer.

The method 1300 further includes forwarding 1310 the second packet to the second remote UE.

Figure 14:
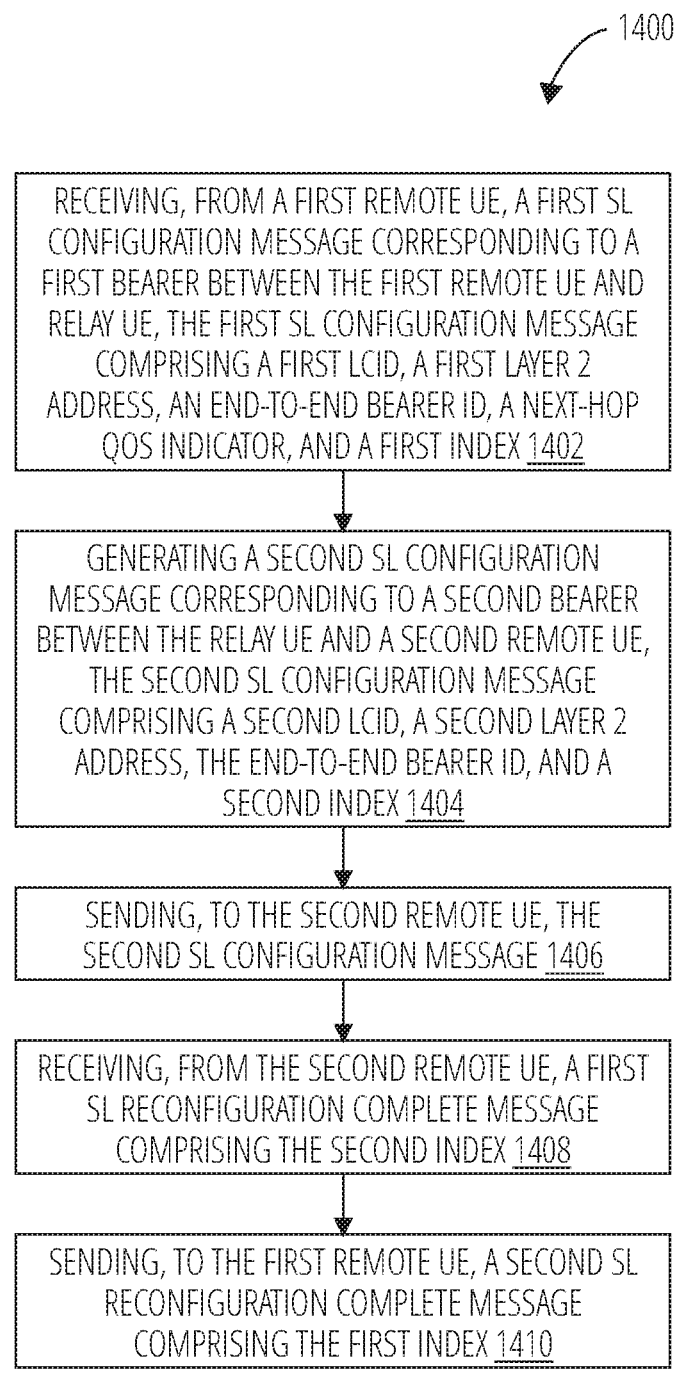
FIG. 14 illustrates a method of a relay UE for establishing a hop by hop path configuration, according to an embodiment.

FIG. 14 illustrates a method 1400 of a relay UE for establishing a hop by hop path configuration, according to an embodiment. The method 1400 includes receiving 1402, from a first remote UE, a first SL configuration message corresponding to a first bearer between the first remote UE, and relay UE, the first St, configuration message comprising a first LCID, a first Layer 2 address, an end-to-end bearer ID, a next-hop QoS indicator, and a first index.

The method 1400 further includes generating 1404 a second SL configuration message corresponding to a second bearer between the relay UE, and a second remote UE, the second SL configuration message comprising a second LCID, a second Layer 2 address, the end-to-end hearer ID, and a second index.

The method 1400 further includes sending 1406, to the second remote UE, the second SL configuration message.

The method 1400 further includes receiving 1408, from the second remote UE, a first SL reconfiguration complete message comprising the second index.

The method 1400 further includes sending 1410, to the first remote UE, a second SL reconfiguration complete message comprising the first index.

Figure 15:
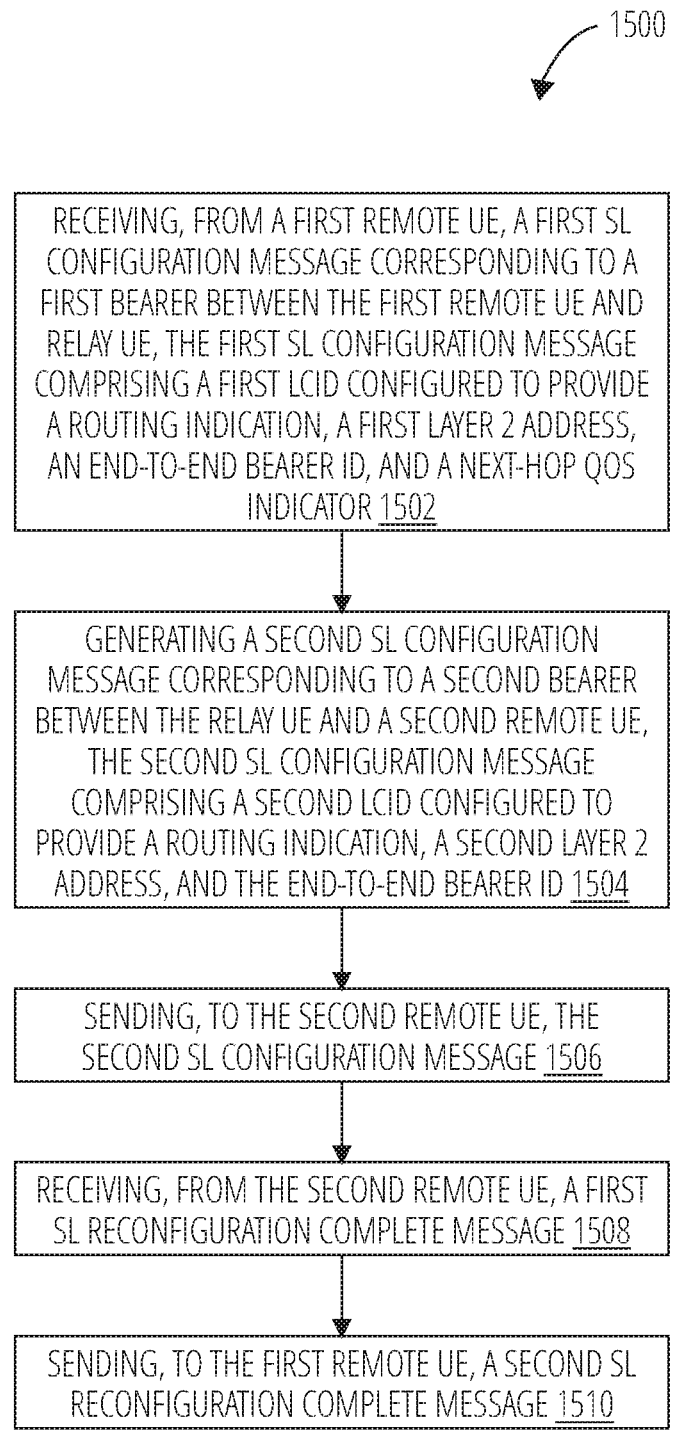
FIG. 15 illustrates a method of a relay UE for establishing a hop by hop path configuration, according to an embodiment.

FIG. 15 illustrates a method 1500 of a relay UE, for establishing a hop by hop path configuration, according to an embodiment. The method 1500 includes receiving 1502, from a first remote UE, a first SL configuration message corresponding to a first bearer between the first remote UE and relay UE, the first SL configuration message comprising a first LCID configured to provide a routing indication, a first Layer 2 address, an end-to-end bearer ID, and a next-hop QoS indicator.

The method 1500 further includes generating 1504 a second SL configuration message corresponding to a second bearer between the relay UE, and a second remote UE, the second SL configuration message comprising a second LCID configured to provide a routing indication, a second Layer 2 address, and the end-to-end bearer ID.

The method 1500 further includes sending 1506, to the second remote UE, the second. SL configuration message.

The method 1500 further includes receiving 1508, from the second remote UE, a first SL reconfiguration complete message.

The method 1500 further includes sending 1510, to the first remote UE, a second SL reconfiguration complete message.

Figure 16:
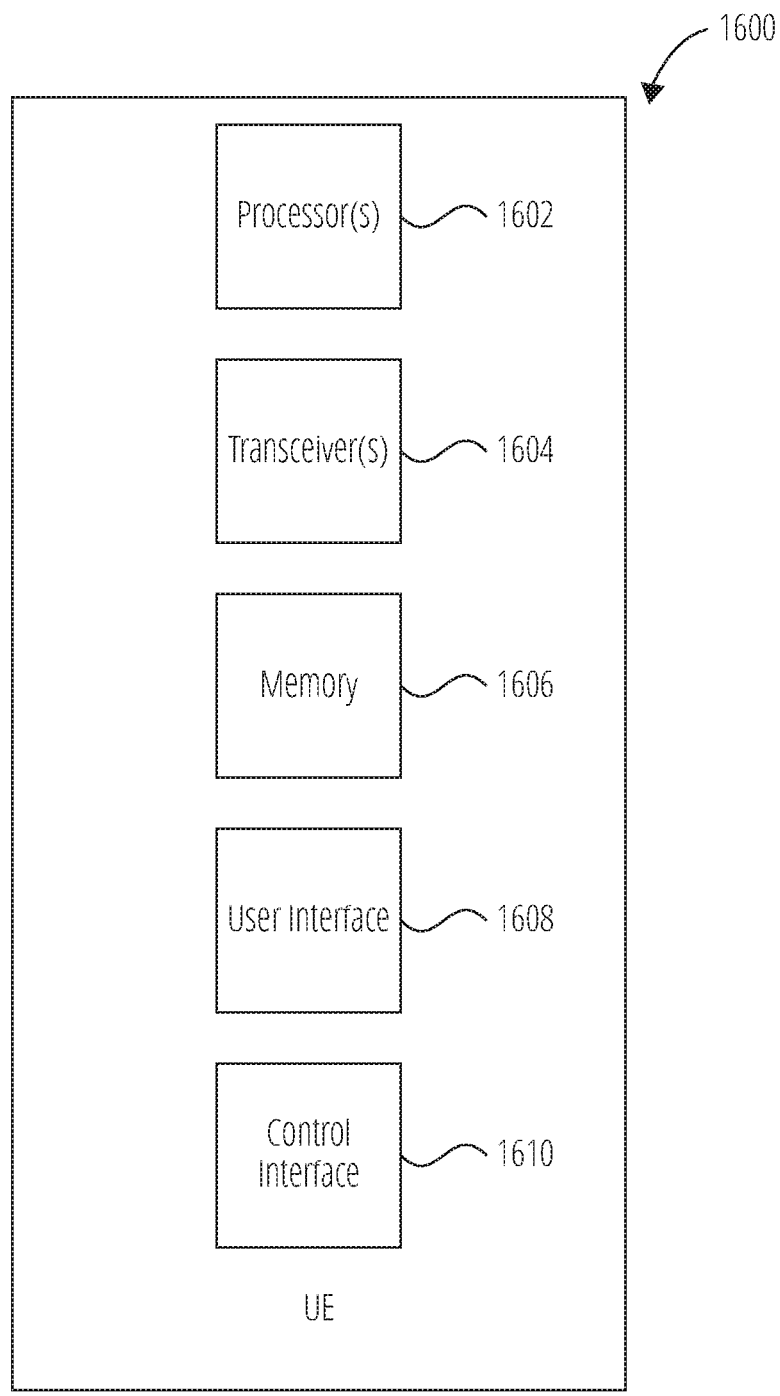
FIG. 16 illustrates a UE in accordance with one embodiment.

FIG. 16 is a block diagram of an example UE 1600 configurable according to various embodiments of the present disclosure, including by execution of instructions on a computer-readable medium that correspond to any of the example methods and/or procedures described herein. The UE 1600 comprises one or more processor 1602, transceiver 1604, memory 1606, user interface 1608, and control interface 1610.

The one or more processor 1602 may include, for example, an application processor, an audio digital signal processor, a central processing unit, and/or one or more baseband processors. Each of the one or more processor 1602 may include internal memory and/or may include interface(s) to communicate with external memory (including the memory 1606). The internal or external memory can store software code, programs, and/or instructions for execution by the one or more processor 1602 to configure and/or facilitate the UE 1600 to perform various operations, including operations described herein. For example, execution of the instructions can configure the UE 1600 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1604, user interface 1608, and/or control interface 1610. As another example, the one or more processor 1602 may execute program code stored in the memory 1606 or other memory that corresponds to MAC, RLC, PDCP, and RRC layer protocols standardized by 3GPP (e.g., for NR and/or LTE). As a further example, the processor 1602 may execute program code stored in the memory 1606 or other memory that, together with the one or more transceiver 1604, implements corresponding PRY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1606 may comprise memory area for the one or more processor 1602 to store variables used in protocols, configuration, control, and other functions of the UE 1600, including operations corresponding to, or comprising, any of the example methods and/or procedures described herein. Moreover, the memory 1606 may comprise non-volatile memory (e.g., flash memory), volatile memory (e.g., static or dynamic RAM), or a combination thereof. Furthermore, the memory 1606 may interface with a memory slot by which removable memory cards in one or more formats (e.g., SD Card, Memory Stick, Compact Flash, etc.) can be inserted and removed.

The one or more transceiver 1604 may include radio-frequency transmitter and/or receiver circuitry that facilitates the UE 1600 to communicate with other equipment supporting like wireless communication standards and/or protocols. For example, the one or more transceiver 1604 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1602. The RF circuitry may also include a transmit signal path that may include circuitry to up-convert baseband signals provided by a baseband processor and provide RF output signals to the FEM for transmission. The FEM may include a receive signal path that may include circuitry configured to operate on RF signals received from one or more antennas, amplify the received signals, and provide the amplified versions of the received signals to the RF circuitry for further processing. The FEM may also include a transmit signal path that may include circuitry configured to amplify signals for transmission provided by the RE circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1604 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 1602 to implement a PHY layer based on OFDM, OFDMA, and/or SC-FDMA technologies, such as described herein with respect to other figures.

The user interface 1608 may take various forms depending on particular embodiments, or can be absent from the UE 1600. In some embodiments, the user interface 1608 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1600 may comprise a tablet computing device including a larger touchscreen display. In such embodiments, one or more of the mechanical features of the user interface 1608 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1600 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1600 having a touch screen display are capable of receiving user inputs, such as inputs related to exemplary methods and/or procedures described herein or otherwise known to persons of ordinary skill in the art.

In some exemplary embodiments of the present disclosure, the UE 1600 may include an orientation sensor, which can be used in various ways by features and functions of the UE 1600. For example, the UE 1600 can use outputs of the orientation sensor to determine when a user has changed the physical orientation of the UE 1600's touch screen display. An indication signal from the orientation sensor can be available to any application program executing on the UE 1600, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1610 may take various forms depending on particular embodiments. For example, the control interface 1610 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, the control interface 1260 can comprise an IEEE 802.3 Ethernet interface such as described above. In some embodiments of the present disclosure, the control interface 1610 may include analog interface circuitry including, for example, one or more digital-to-analog (D/A) and/or analog-to-digital (A/D)) converters.

Persons of ordinary skill in the art can recognize the above list of features, interfaces, and radio-frequency communication standards is merely exemplary, and not limiting to the scope of the present disclosure. In other words, the UE 1600 may include more functionality than is shown in FIG. 16 including, for example, a video and/or still-image camera, microphone, media player and/or recorder, etc. Moreover, the one or more transceiver 1604 may include circuitry for communication using additional radio-frequency communication standards including Bluetooth, GPS, and/or others. Moreover, the one or more processor 1602 may execute software code stored in the memory 1606 to control such additional functionality. For example, directional velocity and/or position estimates output from a GPS receiver can be available to any application program executing on the UE 1600, including various exemplary methods and/or computer-readable media according to various exemplary embodiments of the present disclosure.

Figure 17:
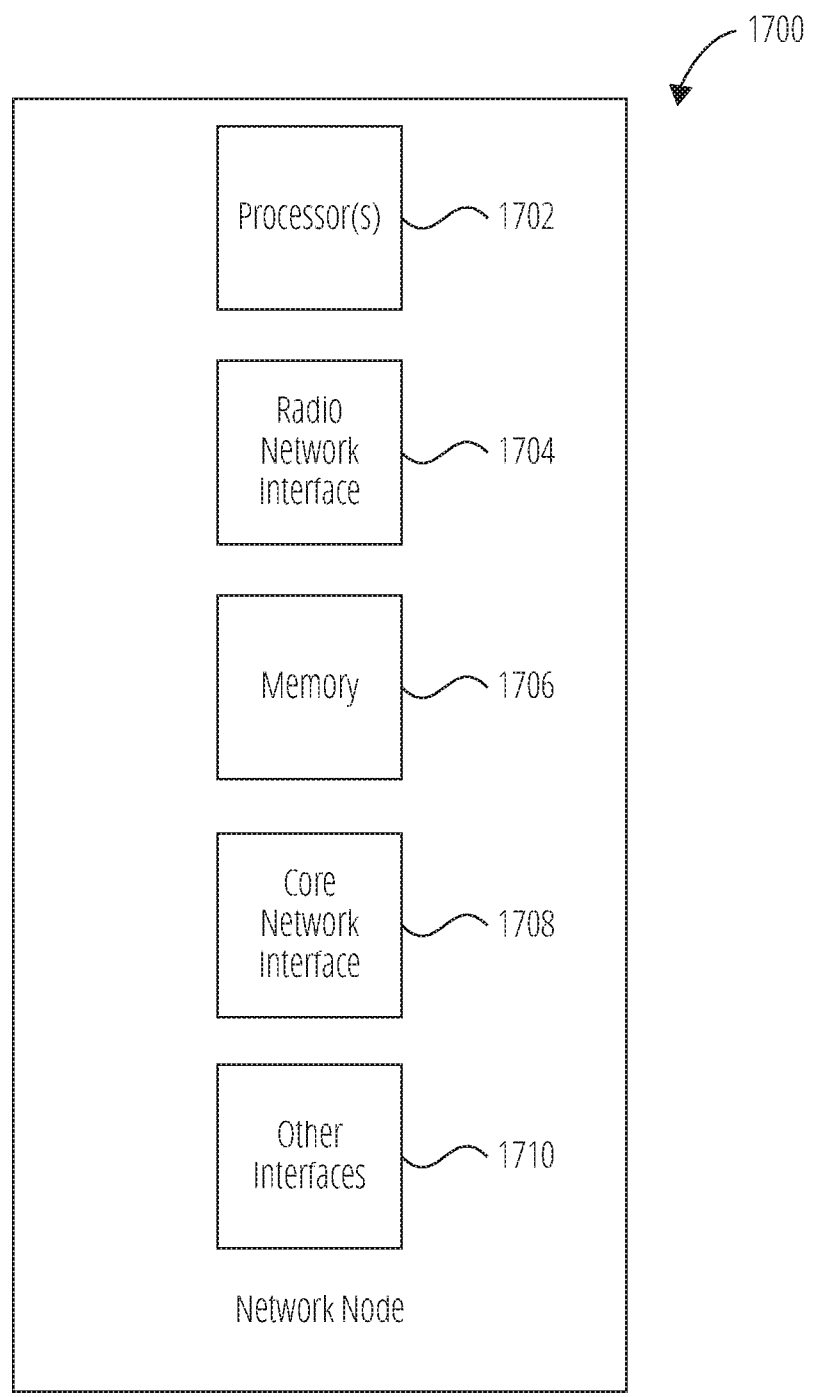
FIG. 17 illustrates a network node in accordance with one embodiment.

FIG. 17 is a block diagram of an example network node 1700 configurable according to various embodiments of the present disclosure, including by execution of instructions on a computer-readable medium that correspond to any of the example methods and/or procedures described herein.

The network node 1700 includes a one or more processor 1702, a radio network interface 1704, a memory 1706, a core network interface 1708, and other interfaces 1710. The network node 1700 may comprise, for example, a base station, an eNB, a gNB, an access node, or a component thereof.

The one or more processor 1702 may include any type of processor or processing circuitry and may be configured to perform any of the methods or procedures disclosed herein. The memory 1706 may store software code, programs, and/or instructions executed by the one or more processor 1702 to configure the network node 1700 to perform various operations, including operations described herein. For example, execution of such stored instructions can configure the network node 1700 to communicate with one or more other devices using protocols according to various embodiments of the present disclosure, including one or more methods and/or procedures discussed above. Furthermore, execution of such stored instructions can also configure and/or facilitate the network node 1700 to communicate with one or more other devices using other protocols or protocol layers, such as one or more of the PRY, MAC, RLC, PDCP, and RRC layer protocols standardized by 3GPP for LTE, LTE-A, and/or NR, or any other higher-layer protocols utilized in conjunction with the radio network interface 1704 and the core network interface 1708. By way of example and without limitation, the core network interface 1708 comprises an S1 interface and the radio network interface 1704 may comprise a Uu interface, as standardized by 3GPP. The memory 1706 may also store variables used in protocols, configuration, control, and other functions of the network node 1700. As such, the memory 1706 may comprise non-volatile memory (e.g., flash memory, hard disk, etc.), volatile memory (e.g., static or dynamic RAM), network-based (e.g., "cloud") storage, or a combination thereof.

The radio network interface 1704 may include transmitters, receivers, signal processors, ASICs, antennas, beamforming units, and other circuitry that enables network node 1700 to communicate with other equipment such as, in some embodiments, a plurality of compatible UE. In some embodiments, the network node 1700 may include various protocols or protocol layers, such as the PHY, MAC, RLC, PDCP, and RRC layer protocols standardized by 3GPP for LTE, LTE.-A, and/or 5G/NR. According to further embodiments of the present disclosure, the radio network interface 1704 may include a PHY layer based on OFDM, OFDMA, and/or SC-TDMA technologies. In some embodiments, the functionality of such a PHY layer can be provided cooperatively by the radio network interface 1704 and the one or more processor 1702.

The core network interface 1708 may include transmitters, receivers, and other circuitry that enables the network node 1700 to communicate with other equipment in a core network such as, in some embodiments, circuit-switched (CS) and/or packet-switched. Core (PS) networks. In some embodiments, the core network interface 1708 may include the S1 interface standardized by 3GPP. In some embodiments, the core network interface 1708 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1708 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1710 may include transmitters, receivers, and other circuitry that enables the network node 1700 to communicate with external networks, computers, databases, and the like for purposes of operations, administration, and maintenance of the network node 1700 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NP services in the network functions described by point-to-point reference point (e.g., N11) between any two network functions (e.g., AMF and SMF).

Figure 18:
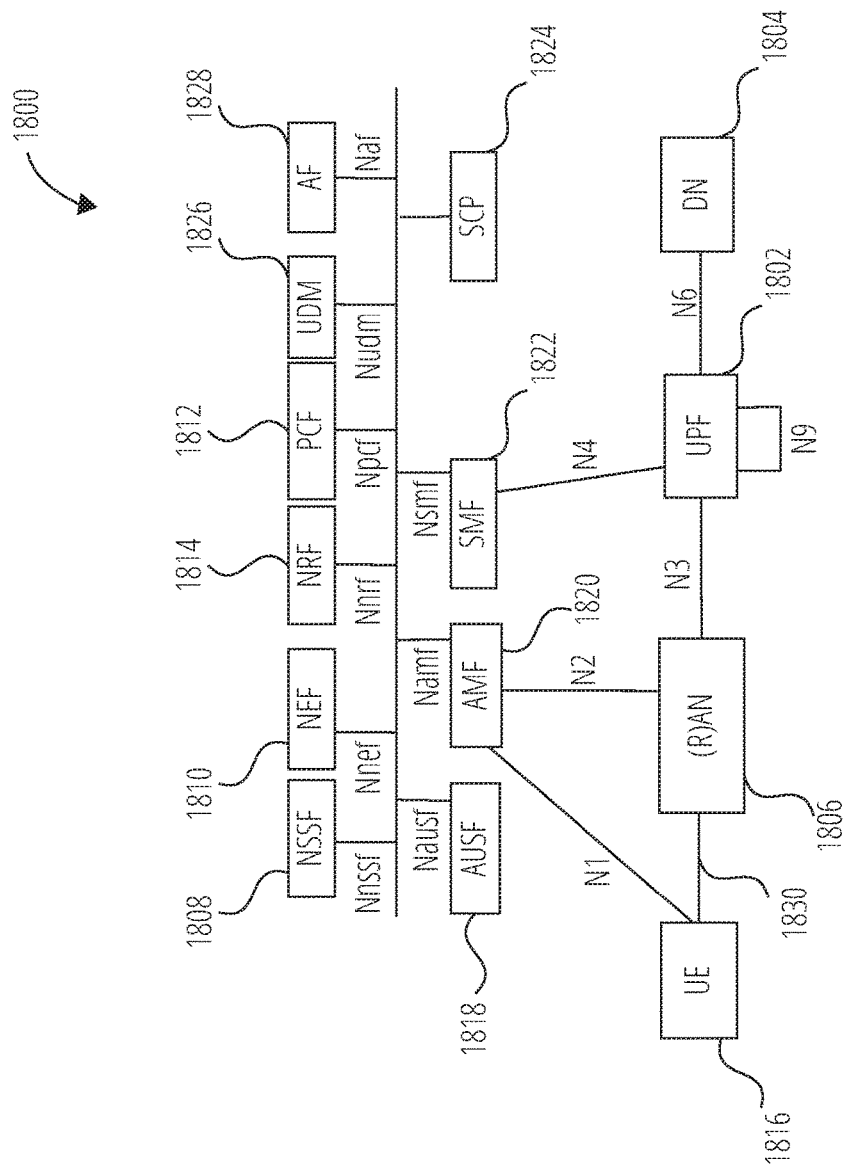
FIG. 18 illustrates an example service based architecture in accordance with certain embodiments.

FIG. 18 illustrates a service based architecture 1800 in 5GS according to one embodiment. As described in 3GPP TS 23.501, the service based architecture 1800 comprises NFs such as an NSSF 1808, a NEF 1810, an NRF 1814, a PCF 1812, a UDM 1826, an AUSF 1818, an AMF 1820, and an SMF 1822, for communication with a UE 1816, a (R)AN 1806, a UPF 1802, and a DN 1804. The NFs and NF services can communicate directly, referred to as Direct Communication, or indirectly via a SCP 1824, referred to as Indirect Communication. FIG. 18 also shows corresponding service-based interfaces including Nutm, Naf, Nudm, Npcf, Nsmf, Nnrf, Namf, Nnef, Nnssf. and Nausf, as well as reference points N1, N2, N3, N4, and N6. A few example functions provided by the NFs shown in FIG. 18 are described below.

The NSSF 1808 supports functionality such as: selecting the, set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMP Set to be used to serve the UP, or, based on configuration, a list of candidate AMF(s), possibly by querying the NRF.

The NEF 1810 supports exposure of capabilities and events. NF capabilities and events may be securely exposed by the NEF 1810 (e.g., for 3rd party, Application Functions, and/or Edge Computing). The NEF 1810 may store/retrieve information as structured data using a standardized interface (Nudr) to a UDR. The NEE 1810 may also secure provision of information from an external application to a 3GPP network and may provide for the Application Functions to securely provide information to the 3GPP network (e.g., expected UE behavior, 5GLAN group information, and service specific information), wherein the NEF 1810 may authenticate and authorize and assist in throttling the Application Functions. The NEF 1810 may provide translation of internal-external information by translating between information exchanged with the AF 1828 and information exchanged with the internal network function. For example, the NEF 1810 translates between an AF-Service-Identifier and internal 5G Core information such as DNN and S-NSSAI. The NEF 1810 may handle masking of network and user sensitive information to external AFs according to the network policy. The NEF 1810 may receive information from other network functions (based on exposed capabilities of other network functions), and stores the received information as structured data using a standardized interface to a UDR. The stored information can be accessed and re-exposed by the NEF 1810 to other network functions and Application Functions, and used for other purposes such as analytics. For external exposure of services related to specific UE(s), the NEF 1810 may reside in the HPLMN. Depending on operator agreements, the NEF 1810 in the HPLMN may have interface(s) with NF(s) in the VPLMN. When a UE is capable of switching between EPC and 5GC, an SCEF+NEF may be used for service exposure.

The NRF 1814 supports service discovery function by receiving an NF Discovery Request from an NF instance or SCP and providing the information of the discovered NF instances to the NF instance or SCP. The NRF 1814 may also support P-CSCE discovery (specialized case of AF discovery by SMF), maintain the NF profile of available NF instances and their supported services, and/or notify about newly registered/updated/deregistered NE instances along with its NF services to the subscribed NE service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and where the NRF(s) in the Home PLMN (known as the hNRF) are configured with information for the home PLMN, referenced by the vNRF via an N27 interface.

The PCF 1812 supports a unified policy framework to govern network behavior. The PCF 1812 provides policy rules to Control Plane function(s) to enforce them. The PCF 1812 accesses subscription information relevant for policy decisions in a Unified Data. Repository (UDR). The PCF 1812 may access the UDR located in the same PLMN as the PCE The UDM 1826 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data e.g., roaming restrictions), UE's Serving NF Registration Management (e.g., storing serving AMF for UE, storing serving SMF for UE's PDU Session), service/session, continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 1826 uses subscription data (including authentication data) that may be stored in a UDR, in which case a UDM implements the application logic and may not require an internal user data storage and several different UDMs may serve the same user in different transactions. The UDM 1826 may be located in the HPLMN of the subscribers it serves, and may access the information of the UDR located in the same PLMN.

The AUSF 1818 supports authentication for 3GPP access and untrusted non-3GPP access. The AUSF 1818 may also provide support for Network Slice-Specific Authentication and Authorization.

The AMF 1820 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMP, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 1820. Regardless of the number of Network functions, in certain embodiments there is only one NAS interface instance per access network between the UE and the CN, terminated at one of the Network functions that implements at least NAS security and Mobility Management. The AMF 1820 may also include policy related functionalities.

In addition to the functionalities described above, the AMF 1820 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to Intrusted non-3GPP (e.g., Paging) access; support of authentication of UEs connected over N3IWF/TNGF; management of mobility, authentication, and separate security context state(s) of a UE connected v is a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 1822 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 1822 may include policy-related functionalities.

The SCP 1824 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR. Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 1824 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 1816 may include a device with radio communication capabilities. For example, the UE 1816 may comprise a smartphone (e.g., handheld touchscreen mobile computing devices connectable to one or more cellular networks). The UE 1816 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 1816 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 1816 may be configured to connect or communicatively couple with the (R)AN 1806 through a radio interface 1830, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP UE protocol, a 5G protocol, a NR protocol, and the like. For example, the UE 1816 and the (R)AN 1806 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 1806 to the UE 1816 and a UL transmission may be from the UE 1816 to the (R)AN 1806. The UE 1816 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a. Physical Sidelink Shared Channel (PSSCH), a Physical Sidelink Discovery Channel (PSDCH), and a Physical Sidelink Broadcast Channel (PSBCH).

The (R)AN 1806 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 1806 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell UEs in a Closed Subscriber Group (CSG), UEs for users in the home, etc.).

Although not shown, multiple RAN nodes (such as the (R)AN 1806) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 1816 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node, and control of user plane tunnels between old (source) serving (R)AN node to new (target) serving (R)AN node.

The UPF 1802 may act as an anchor point for intra-RAT and inter-RAT mobility, an external PDU session point of interconnect to the DN 1804, and a branching point to support a multi-homed PDU session. The UPF 1802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering, and downlink data notification triggering. The UPF 1802 may include an uplink classifier to support routing traffic flows to a data network. The DN 1804 may represent various network operator services. Internet access, or third party services. The DN 1804 may include, for example, an application server.

Figure 19:
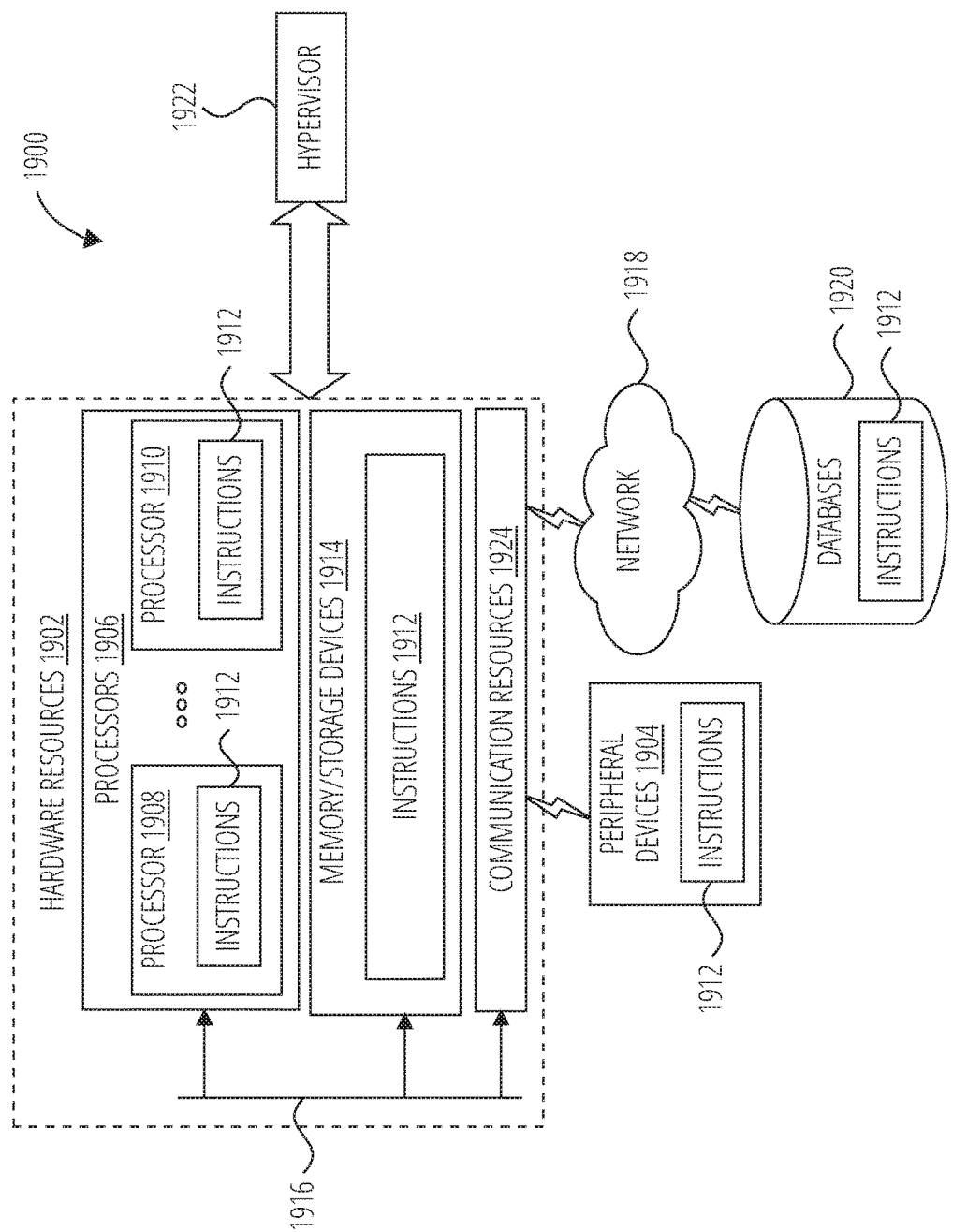
FIG. 19 illustrates components in accordance with one embodiment.

FIG. 19 is a block diagram illustrating components 1900, according to some example embodiments, able to read instructions from a machine-readable or computer-readable medium (e.g., a non-transitory machine-readable storage medium) and perform any one or more of the methodologies discussed herein. Specifically, FIG. 19 shows a diagrammatic representation of hardware resources 1902 including one or more processors 1906 (or processor cores), one or more memory/storage devices 1914, and one or more communication resources 1924, each of which may be communicatively coupled via a bus 1916. For embodiments where node virtualization (e.g., NFV) is utilized, a hypervisor 1922 may be executed to provide an execution environment for one or more network slices/sub-slices to utilize the hardware resources 1902.

The processors 1906 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1908 and a processor 1910.

The memory/storage devices 1914 may include main memory, disk storage, or any suitable combination thereof. The memory/storage devices 1914 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1924 may include interconnection or network interface components or other suitable devices to communicate with one or more peripheral devices 1904 or one or more databases 1920 via a network 1918. For example, the communication resources 1924 may include wired communication components for coupling via a Universal Serial Bus (USB)), cellular communication components, NFC components, Bluetooth® components (e.g., Bluetooth® Low Energy), Wi-Fi® components, and other communication components.

Instructions 1912 may comprise software, a program, an application, an applet, an app, or other executable code for causing at least any of the processors 1906 to perform any one or more of the methodologies discussed herein. The instructions 1912 may reside, completely or partially, within at least one of the processors 1906 (e.g., within the processor's cache memory), the memory/storage devices 1914, or any suitable combination thereof. Furthermore, any portion of the instructions 1912 may be transferred to the hardware resources 1902 from any combination of the peripheral devices 1904 or the databases 1920. Accordingly, the memory of the processors 1906, the memory/storage devices 1914, the peripheral devices 1904, and the databases 1920 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method of a relay user equipment (UE), comprising: receiving, from a first remote UE, a data packet comprising a radio link control (RLC) protocol data unit (PDU) comprising a packet data convergence protocol (PDCP) PDU and a first adaptation header having first routing information; decoding the first routing information from the first adaptation header at an adaptation layer of the relay UE that is between an RLC layer of the UE and a PDCP layer of the UE; determining, based on the first routing information, that the PDCP PDU should be forwarded to a second remote UE; generating a second packet comprising the PDCP PDU; and forwarding the second packet to the second remote UE.

Example 2 is the method of Example 1, wherein the first routing information includes an identity of an end-to-end bearer.

Example 3 is the method of Example 2, wherein the end-to-end bearer is a PDCP bearer traveling from the first remote UE, through the relay UE, and terminating at the second remote UE.

Example 4 is the method of Example 2, wherein the end-to-end bearer is a data radio bearer (DRB).

Example 5 is the method of Example 2, wherein the end-to-end bearer is a signaling radio bearer (SRB).

Example 6 is the method of any of Examples 1 through 5, wherein the first routing information includes a Layer 2 address for the second remote UE.

Example 7 is the method of any of Examples 1 through 6, wherein the first routing information includes Quality of Service (QoS) information.

Example 8 is the method of any of Examples 1 through 7, wherein the second packet comprises a second adaptation header comprising second routing information.

Example 9 is the method of any of Examples 1 through 8, wherein the second routing information comprises a Layer 2 address for the first remote UE.

Example 10 is a method of a relay user equipment (UE), comprising: receiving, from a first remote UE, a data packet comprising a logical channel identifier (LCID) and a radio link control (RLC) protocol data unit (PDU) comprising a packet data convergence protocol (PDCP) PDU and a first adaptation header having first routing information; decoding the first routing information from the first adaptation header at an adaptation layer of the relay UE that is between an RLC layer of the UE and a PDCP layer of the UE; determining, based on the LCID and the first routing information, that the PDCP PDU should be forwarded to a second remote UE; generating a second packet comprising the PDCP PDU; and forwarding the second packet to the second remote UE.

Example 11 is the method of Example 10, wherein the LCID is a value that indicates that the PDCP PDU should be forwarded.

Example 12 is the method of any of Examples 10 through 11, further comprising identifying, based on an index located in the first routing information, a bearer between the relay UE and the second remote UE to use to forward the PDCP PDU to the second remote UE; wherein the second packet is forwarded to the second remote UE using the bearer.

Example 13 is the method of Example 12, wherein the bearer between the relay UE and the second remote UE is an RLC bearer.

Example 14 is a method of a relay user equipment (UE), comprising: receiving, from a first remote UE, a data packet comprising a medium access control (MAC) header, a logical channel identifier (LCID) comprising a routing indication, and a radio link control RLC protocol data unit (PDU) comprising a packet data convergence protocol (PDCP) PDU; determining, based on the routing indication of the LCID and a Layer 2 address provided in the MAC header, that the PDCP PDU should be forwarded to the second remote UE; generating a second packet comprising the PDCP PDU; and forwarding the second packet to the second remote UE.

Example 15 is the method of Example 14, further comprising identifying, based on the routing indication in the LCID, a bearer between the relay UE and the second remote UE to use to forward the PDCP PDU to the second remote UE; wherein the second packet is forwarded to the second remote UE using the bearer.

Example 16 is the method of Example 15, wherein the bearer between the relay UE and the second remote UE is an RLC bearer.

Example 17 is the method of any of Examples 14 through 16, wherein the Layer 2 address is a Layer 2 address of the first remote UE.

Example 18 is a method of a relay user equipment (UE) for establishing a hop by hop path configuration, comprising: receiving, from a first remote UE, a first sidelink (SL) configuration message corresponding to a first bearer between the first remote UE and relay UE, the first SL configuration message comprising a first logical channel identifier (LCID), a first Layer 2 address, an end-to-end bearer ID, a next-hop quality of service (QoS) indicator, and a first index; generating a second SL configuration message corresponding to a second bearer between the relay UE and a second remote UE, the second. SL configuration message comprising a second LCID, a second Layer 2 address, the end-to-end bearer ID, and a second index; sending, to the second remote UE, the second SL configuration message; receiving, from the second remote UE, a first SL reconfiguration complete message comprising the second index; and sending, to the first remote UE, a second SL reconfiguration complete message comprising the first index.

Example 19 is the method of Example 18, wherein each of the first bearer and the second bearer is a radio link control (RLC) bearer.

Example 20 is the method of any of Examples 18 through 19, wherein the first bearer between the first remote UE and the relay UE is a new bearer, and wherein the first SL configuration message further comprises new bearer configuration information.

Example 21 is the method of any of Examples 18 and 19, wherein the first bearer between the first remote UE and the relay UE is an existing bearer.

Example 22 is the method of any of Examples 18 through 21, wherein the second LCID is selected by the relay UE for use in the second SL configuration message based on the next-hop QoS indicator from the first remote UE.

Example 23 is the method of any of Examples 18 through 22, wherein the first Layer 2 address is a destination address and the second Layer 2 address is a source address.

Example 24 is a method of a relay UE for establishing a hop by hop path configuration, comprising: receiving, from a first remote UE, a first sidelink (SL) configuration message corresponding to a first hearer between the first remote UE and relay UE, the first SL configuration message comprising a first logical channel identifier (LCID) configured to provide a routing indication, a first Layer 2 address, an end-to-end bearer ID, and a next-hop quality of service (QoS) indicator; generating a second SL configuration message corresponding to a second bearer between the relay UE and a second remote UE, the second SL configuration message comprising a second LCID configured to provide a routing indication, a second Layer 2 address, and the end-to-end bearer ID; sending, to the second remote UE, the second SL configuration message; receiving, from the second remote UE, a first SL reconfiguration complete message; and sending, to the first remote UE, a second SL reconfiguration complete message.

Example 25 is the method of Example 24, wherein the first bearer between the first remote UE and the relay UE is a new bearer, and wherein the first SL configuration message further comprises new bearer configuration information.

Example 26 is the method of Example 24, wherein each of the first bearer and the second bearer is a radio link control (RLC) bearer.

Example 27 is the method of any of Examples 24 through 26, wherein the second LCID is selected by the relay UE based on the next-hop QoS indicator from the first remote UE.

Example 28 is the method of any of Examples 24 through 27, wherein the first Layer 2 address is a destination address and the second Layer 2 address is a source address.

Example 29 may include an apparatus comprising means to perform one or more elements of a method described in or related to any of the above Examples, or any other method or process described herein.

Example 30 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 31 may include an apparatus comprising logic, modules, or circuitry to perform one or more elements of a method described in or related to any of the above Examples, or any other method or process described herein.

Example 32 may include a method, technique, or process as described in or related to any of the above Examples, or portions or parts thereof.

Example 33 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 34 may include a signal as described in or related to any of the above Examples, or portions or parts thereof.

Example 35 may include a datagram, packet, frame, segment, protocol data unit (PDU), or message as described in or related to any of the above Examples, or portions or parts thereof, or otherwise described in the present disclosure.

Example 36 may include a signal encoded with data as described in or related to any of the above Examples, or portions or parts thereof, or otherwise described in the present disclosure.

Example 37 may include a signal encoded with a datagram, packet, frame, segment, PDU, or message as described in or related to any of the above Examples, or portions or parts thereof, or otherwise described in the present disclosure.

Example 38 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 39 may include a computer program comprising instructions, wherein execution of the program by a processing element is to cause the processing element to carry out the method, techniques, or process as described in or related to any of the above Examples, or portions thereof.

Example 40 may include a signal in a wireless network as shown and described herein.

Example 41 may include a method of communicating in a wireless network as shown and described herein.

Example 42 may include a system for providing wireless communication as shown and described herein.

Example 43 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems, or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a relay user equipment (UE), comprising:
receiving, from a first remote UE, a data packet comprising a radio link control (RLC) protocol data unit (PDU) comprising a packet data convergence protocol (PDCP) PDU and a first adaptation header having first routing information;
decoding the first routing information from the first adaptation header at an adaptation layer of the relay UE that is between an RLC layer of the UE and a PDCP layer of the UE;
determining, based on the first routing information, that the PDCP PDU should be forwarded to a second remote UE;
generating a second packet comprising the PDCP PDU; and
forwarding the second packet to the second remote UE.

2. The method of claim 1, wherein the first routing information includes an identity of an end-to-end bearer.

3. The method of claim 2, wherein the end-to-end bearer is a PDCP bearer traveling from the first remote UE, through the relay UE, and terminating at the second remote UE.

4. The method of claim 2, wherein the end-to-end bearer is a data radio bearer (DRB).

5. The method of claim 2, wherein the end-to-end bearer is a signaling radio bearer (SRB).

6. The method of claim 1, wherein the first routing information includes a Layer 2 address for the second remote UE.

7. The method of claim 1, wherein the first routing information includes Quality of Service (QoS) information.

8. The method of claim 1, wherein the second packet comprises a second adaptation header comprising second routing information.

9. The method of claim 8, wherein the second routing information comprises a Layer 2 address for the first remote UE.

10. A method of a relay user equipment (UE), comprising:
receiving, from a first remote UE, a data packet comprising a logical channel identifier (LCID) and a radio link control (RLC) protocol data unit (PDU) comprising a packet data convergence protocol (PDCP) PDU and a first adaptation header having first routing information;
decoding the first routing information from the first adaptation header at an adaptation layer of the relay UE that is between an RLC layer of the UE and a PDCP layer of the UE;
determining, based on the LCID and the first routing information, that the PDCP PDU should be forwarded to a second remote UE;
generating a second packet comprising the PDCP PDU; and
forwarding the second packet to the second remote UE.

11. The method of claim 10, wherein the LCID is a value that indicates that the PDCP PDU should be forwarded.

12. The method of claim 10 further comprising identifying, based on an index located in the first routing information, a bearer between the relay UE and the second remote UE to use to forward the PDCP PDU to the second remote UE; wherein the second packet is forwarded to the second remote UE using the bearer.

13. The method of claim 12, wherein the bearer between the relay UE and the second remote UE is an RLC bearer.

14. A method of a relay user equipment (UE), comprising:
receiving, from a first remote UE, a data packet comprising a medium access control (MAC) header, a logical channel identifier (LCID) comprising a routing indication, and a radio link control (RLC) protocol data unit (PDU) comprising a packet data convergence protocol (PDCP) PDU;
determining, based on the routing indication of the LCID and a Layer 2 address provided in the MAC header, that the PDCP PDU should be forwarded to a second remote UE;
generating a second packet comprising the PDCP PDU; and
forwarding the second packet to the second remote UE.

15. The method of claim 14, further comprising identifying, based on the routing indication in the LCID, a bearer between the relay UE and the second remote UE to use to forward the PDCP PDU to the second remote UE; wherein the second packet is forwarded to the second remote UE using the bearer.

16. The method of claim 15, wherein the bearer between the relay UE and the second remote UE is an RLC bearer.

17. The method of claim 14, wherein the Layer 2 address is a Layer 2 address of the first remote UE.

* * * * *